US007115031B2

(12) United States Patent
Miyamoto et al.

(10) Patent No.: US 7,115,031 B2
(45) Date of Patent: Oct. 3, 2006

(54) GAME SYSTEM DISPLAYING A GAME WORLD ON A COMMON DISPLAY AND AN INDIVIDUAL DISPLAY

(75) Inventors: Shigeru Miyamoto, Kyoto (JP); Takao Sawano, Kyoto (JP); Tomohiro Kawase, Kyoto (JP); Tsutomu Araki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 379 days.

(21) Appl. No.: 10/135,525

(22) Filed: May 1, 2002

(65) Prior Publication Data

US 2002/0165028 A1 Nov. 7, 2002

(30) Foreign Application Priority Data

May 2, 2001 (JP) ............................. 2001-135027

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/1; 463/30; 463/31; 463/37; 463/40; 463/43; 273/148 B; 273/148 R

(58) Field of Classification Search .................... 463/1, 463/30, 31, 32, 40, 43, 37; 343/733, 737, 343/747, 750, 751, 759, 761, 778, 866, 4, 343/964; 273/148 B, 148 R
See application file for complete search history.

(56) References Cited

U.S. PATENT DOCUMENTS

| 4,072,310 | A | | 2/1978 | Beam |
| 4,168,796 | A | | 9/1979 | Fulks et al. |
| 4,521,014 | A | * | 6/1985 | Sitrick ........................ 463/31 |
| 4,572,509 | A | | 2/1986 | Sitrick |
| 4,695,946 | A | | 9/1987 | Andreasen et al. |
| 4,715,818 | A | * | 12/1987 | Shapiro et al. ............. 434/118 |
| 4,858,930 | A | | 8/1989 | Sato |

(Continued)

FOREIGN PATENT DOCUMENTS

GB 2232087 5/1990

(Continued)

OTHER PUBLICATIONS

Chad Hanson, Diablo for PC Video Game Review and Cheats, Oct. 12, 1999, downloaded from <http://www.gamezilla.com/review.aspx?review=7066>, pp. 1-5.*

(Continued)

*Primary Examiner*—Corbett B. Coburn
*Assistant Examiner*—Sunit Pandya
(74) *Attorney, Agent, or Firm*—Nixon & Vanderhye P.C.

(57) ABSTRACT

A game system includes a plurality of game machines each of which has an LCD. A game world in which a plurality of characters individually operated by the plurality of game machines appear is displayed on a CRT as a common display and on the LCD as an individual display of each of players. Specifically, a game world having a fixed viewpoint capable of viewing the plurality of characters is displayed on the CRT, and a three-dimensional game world having a viewpoint with reference to one's character is displayed on the LCD. One of the CRT or one's LCD is changeably selected as an operation screen. When a direction instructing key is operated, a moving direction of one's character is determined with reference to the operation screen, and one's character is moved to the determined moving direction.

37 Claims, 21 Drawing Sheets

U.S. PATENT DOCUMENTS

| | | | |
|---|---|---|---|
| 4,905,280 A | 2/1990 | Wiedemer | |
| 5,043,887 A | 8/1991 | Richardson | |
| 5,048,831 A | 9/1991 | Sides | |
| 5,119,295 A | 6/1992 | Kapur | |
| 5,184,830 A | 2/1993 | Okada et al. | |
| 5,240,249 A | 8/1993 | Czarnecki et al. | |
| 5,343,461 A | 8/1994 | Barton et al. | |
| 5,349,689 A | 9/1994 | Suzuki | |
| 5,350,176 A | 9/1994 | Hochstein et al. | |
| 5,367,394 A | 11/1994 | Chuter et al. | |
| 5,393,072 A | 2/1995 | Best | |
| 5,393,073 A | 2/1995 | Best | |
| 5,396,225 A | 3/1995 | Okada et al. | |
| 5,408,408 A | 4/1995 | Marsico, Jr. | |
| 5,428,528 A | 6/1995 | Takenouchi et al. | |
| 5,440,565 A | 8/1995 | Miyamoto et al. | |
| 5,530,795 A * | 6/1996 | Wan | 345/759 |
| 5,581,712 A | 12/1996 | Herrman | |
| 5,618,045 A | 4/1997 | Kagan et al. | |
| 5,682,207 A * | 10/1997 | Takeda et al. | 348/568 |
| 5,702,305 A | 12/1997 | Norman et al. | |
| 5,727,170 A | 3/1998 | Mitchell et al. | |
| 5,759,100 A | 6/1998 | Nakanishi | |
| 5,762,555 A | 6/1998 | Crump et al. | |
| 5,795,228 A | 8/1998 | Trumbull et al. | |
| 5,828,862 A | 10/1998 | Singkornrat et al. | |
| 5,831,664 A * | 11/1998 | Wharton et al. | 725/81 |
| 5,876,351 A | 3/1999 | Rohde | |
| 5,951,462 A | 9/1999 | Yamanaka | |
| 5,971,855 A | 10/1999 | Ng | |
| 5,976,015 A | 11/1999 | Seelig et al. | |
| 5,991,530 A | 11/1999 | Okada et al. | |
| 5,991,839 A | 11/1999 | Ninomiya | |
| 6,007,428 A | 12/1999 | Nishiumi et al. | |
| 6,009,538 A | 12/1999 | Goowdin, III et al. | |
| 6,042,476 A | 3/2000 | Ohashi et al. | |
| 6,042,478 A | 3/2000 | Ng | |
| 6,056,640 A | 5/2000 | Schaaij | |
| 6,071,194 A | 6/2000 | Sanderson et al. | |
| 6,083,104 A | 7/2000 | Choi | |
| 6,085,268 A | 7/2000 | Lee et al. | |
| 6,098,138 A | 8/2000 | Martinelli et al. | |
| 6,115,765 A | 9/2000 | Lee | |
| 6,123,619 A | 9/2000 | Tokita et al. | |
| 6,126,547 A | 10/2000 | Ishimoto | |
| 6,132,315 A | 10/2000 | Miyamoto et al. | |
| 6,135,887 A | 10/2000 | Pease et al. | |
| 6,139,434 A | 10/2000 | Miyamoto et al. | |
| 6,145,035 A | 11/2000 | Mai et al. | |
| 6,165,068 A | 12/2000 | Sonoda et al. | |
| 6,168,524 B1 | 1/2001 | Aoki et al. | |
| 6,179,713 B1 * | 1/2001 | James et al. | 463/42 |
| 6,238,291 B1 | 5/2001 | Fujimoto et al. | |
| 6,500,070 B1 | 12/2002 | Tomizawa et al. | |
| 2002/0111216 A1 * | 8/2002 | Himoto et al. | 463/43 |

FOREIGN PATENT DOCUMENTS

| | | | |
|---|---|---|---|
| GB | 2287629 | | 9/1995 |
| JP | 60172878 | * | 9/1985 |
| JP | 4-123119 | | 4/1992 |
| JP | 4-266781 | | 9/1992 |
| JP | 6285259 | * | 3/1993 |
| JP | 6-61390 | | 8/1994 |
| JP | 6-285259 | * | 10/1994 |
| JP | 11-226257 | | 8/1999 |
| JP | 2000-334170 | | 12/2000 |
| WO | WO 98/11692 | | 3/1998 |

OTHER PUBLICATIONS

Darkstone version 1.03, Jul. 15, 1999, downloaded from <http://www.cdmag.com/articles/022/173/read.txt>, pp. 1-3.*

Ahlstrom et al., Computer-Human Interface Guidelines: A Revision to Chapter 8 of the Human Factors Design Guide, DOT/FAA/CT01/08, Apr. 2001, pp. 1-6,34-41,55,58,59,65,66,153,158,168,169.*

* cited by examiner

FIG. 4
(A)
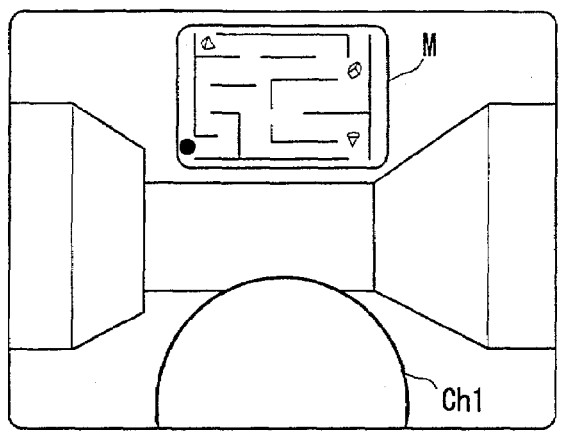
(B)
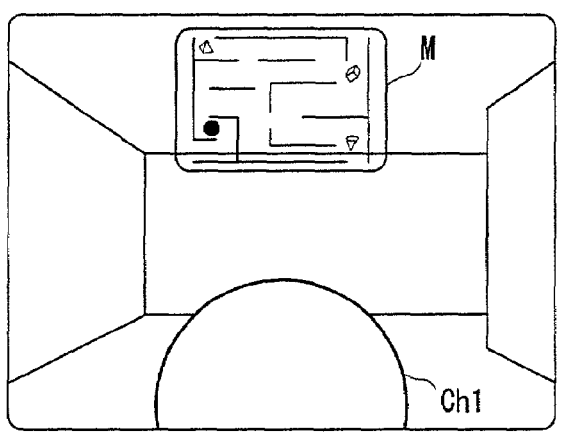
(C)
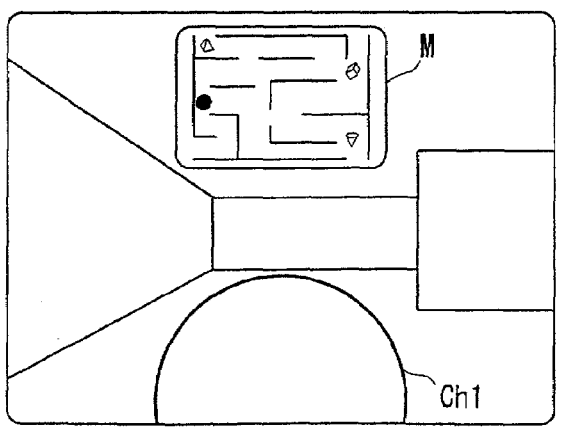

FIG. 7

DVD-ROM

GAME PROGRAM/DATA FOR VIDEO GAME MACHINE

- PROGRAM FOR PROGRAM TRANSFER PGC1
- DISPLAY CONTROL PROGRAM PGC2
- KEY INFORMATION RECEIVING PROGRAM PGC3
- POSITION INFORMATION RENEWAL PROGRAM PGC4
- POSITION INFORMATION TRANSMITTING PROGRAM PGC5
- GAME WORLD DATA DGC1
- CHARACTER DATA DGC2

⋮

GAME PROGRAM/DATA FOR PORTABLE GAME MACHINE

- DISPLAY CONTROL PROGRAM PGB1
- KEY INFORMATION TRANSMITTING PROGRAM PGB2
- POSITION INFORMATION RECEIVING PROGRAM PGB3
- POSITION INFORMATION RENEWAL PROGRAM PGB4
- GAME WORLD DATA DGB1
- MAPPING DATA DGB2
- CHARACTER DATA DGB3

⋮

FIG. 8
(A) GAME WORLD DATA FOR VIDEO GAME MACHINE
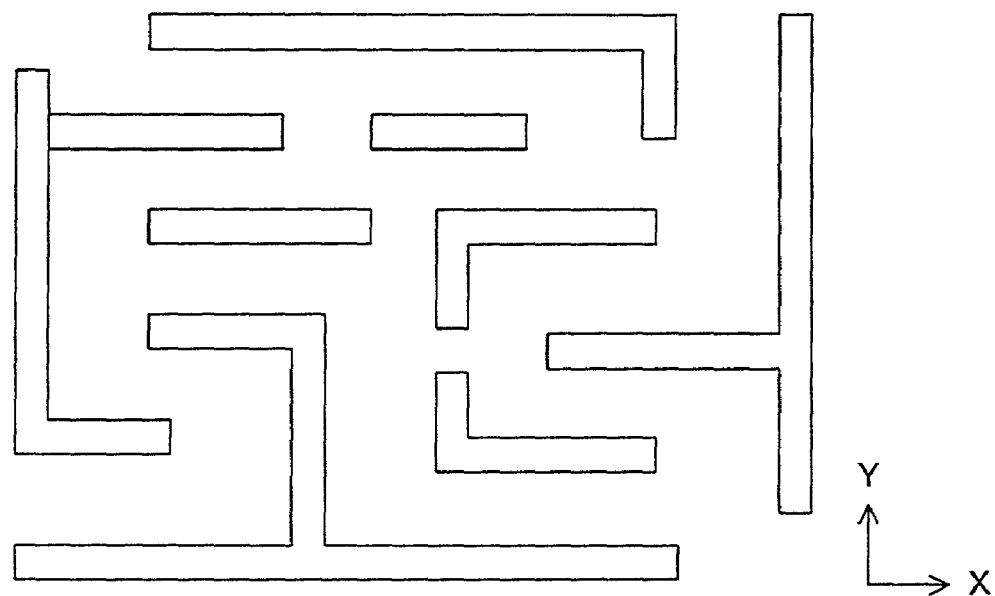
(B) CHARACTER DATA FOR VIDEO GAME MACHINE

FIG. 9
(A) GAME WORLD DATA FOR PORTABLE GAME MACHINE
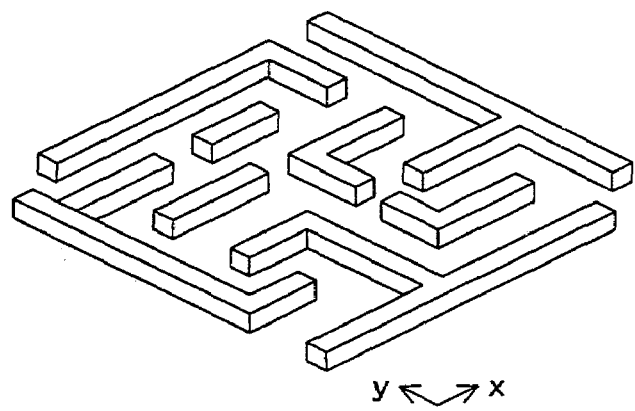
(B) MAP DATA FOR PORTABLE GAME MACHINE
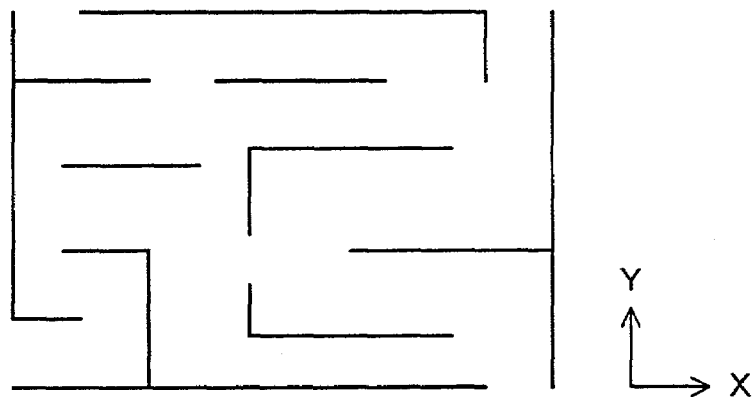
(C) CHARACTER DATA FOR PORTABLE GAME MACHINE
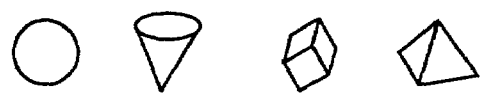

| POSITION INFORMATION OF CHARACTER Ch1 |
|---|
| MOVING DIRECTION (x, -x, y or -y) |
| LOCATION (X1, Y1) |
| OPERATION SCREEN FLAG OF CHARACTER Ch1 |
| SET/RESET<br>(SET: OPERATION SCREEN =CRT, RESET: OPERATION SCREEN=LCD) |
| POSITION INFORMATION OF CHARACTER Ch2 |
| MOVING DIRECTION (x, -x, y or -y) |
| LOCATION (X2, Y2) |
| OPERATION SCREEN FLAG OF CHARACTER Ch2 |
| SET/RESET<br>(SET: OPERATION SCREEN=CRT, RESET: OPERATION SCREEN=LCD) |
| ⋮ |
| POSITION INFORMATION OF CHARACTER Ch4 |
| MOVING DIRECTION (x, -x, y or -y) |
| LOCATION (X4, Y4) |
| OPERATION SCREEN FLAG OF CHARACTER Ch4 |
| SET/RESET<br>(SET: OPERATION SCREEN=CRT, RESET: OPERATION SCREEN=LCD) |

| POSITION INFORMATION OF CHARACTER Ch1 |
| MOVING DIRECTION (x, -x, y or -y) |
| LOCATION (X1, Y1) |
| POSITION INFORMATION OF CHARACTER Ch2 |
| MOVING DIRECTION (x, -x, y or -y) |
| LOCATION (X2, Y2) |
| ⋮ |
| POSITION INFORMATION OF CHARACTER Ch4 |
| MOVING DIRECTION (x, -x, y or -y) |
| LOCATION (X4, Y4) |

FIG. 21 (PRIOR ART)
(A)
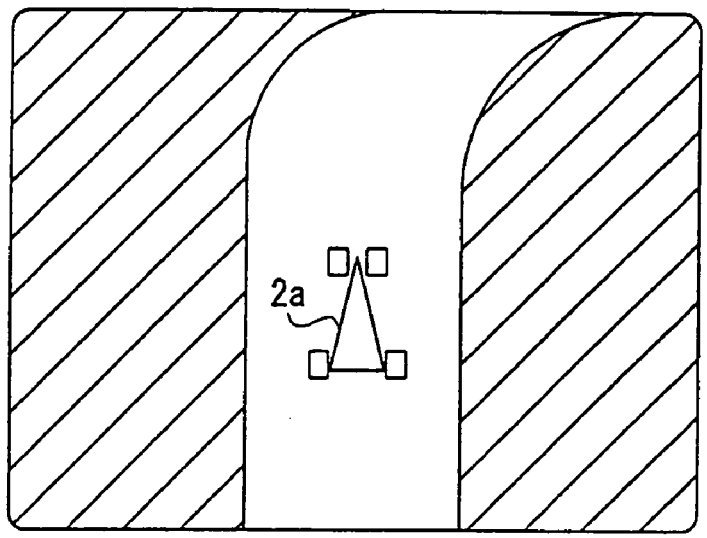
(B)
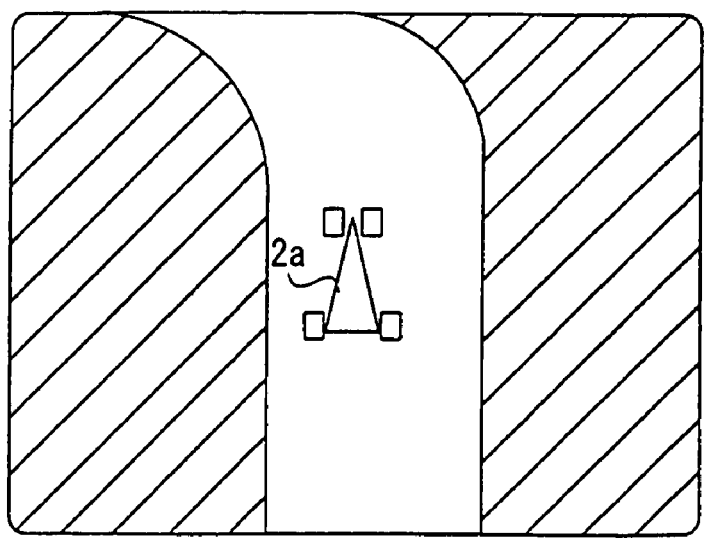

GAME SYSTEM DISPLAYING A GAME WORLD ON A COMMON DISPLAY AND AN INDIVIDUAL DISPLAY

FIELD OF THE INVENTION

The present invention relates to a game system provided with a plurality of controllers having a direction instructing key, a common display and an individual display. More specifically, the present invention relates to a game system displaying a game world in which a plurality of characters including a player character operated by the controller appear on the common display and the individual display.

BACKGROUND AND SUMMARY OF THE INVENTION

One example of a related conventional game system is disclosed in a Japanese Patent Laying-open No. 2000-334170 laid-open on Dec. 5, 2000. This prior art includes a video game machine connected to a television monitor and a plurality of portable game machines each of which functions as a controller of the video game machine. When a storage medium storing a game program is attached to the video game machine, the game program is executed by the video game machine and the plurality of portable game machines, and therefore, a game world is displayed on the television monitor and liquid crystal display monitors of the portable game machines. In this case, a player can progress in a game while making one's liquid crystal display monitor as an operation screen and while referring to the television monitor.

However, assuming that a game, such as a racing game, when controlling one's character using a direction instruction key in the prior art system, the following problem arises. For example, in the racing game, a racing course 1 and a plurality of racing cars 2 *a* to 2*c* are displayed on the television monitor as shown in FIG. 20, and the racing car 2*a* operated by any one of players is displayed on the liquid crystal display monitor of the player as shown in FIG. 21 (A) or FIG. 21 (B). While the racing car 2*a* drives at a place A shown in FIG. 20, a direction or posture of the racing car 2*a* is the same with respect to the television monitor and the liquid crystal display monitor as understood from FIG. 20 and FIG. 21(A). In this case, even if the racing car 2*a* is operated with viewing any one of the television monitor and the liquid crystal display monitor, an instruction for moving in the right direction by the direction instructing key, turns the racing car 2*a* to the right.

However, when the racing car 2*a* runs at a place B shown in FIG. 20, the direction or posture of the racing car 2*a* is inverted with respect to the television monitor and the liquid crystal display monitor as understood from FIG. 20 and FIG. 21(B). In this case, if the operation screen is the liquid crystal display monitor, it is appropriate that the left direction is instructed so as to make the racing car 2*a* direct to the left direction. On the other hand, irrespective of use of the liquid crystal display monitor as the operation screen, in a case one's racing car 2*a* is operated observing the whole game world, there is a need for the car to be directed to the left direction which is opposite to the right direction a character on the television monitor is to be directed.

Thus, in a game utilizing the direction instructing key, a moving direction of the character (instructing direction with respect to the character) may be inverted between the television monitor and the liquid crystal display monitor depending on the direction or posture of the character. Therefore, in a game system in which the game progresses using the liquid crystal display monitor as the operation screen referring to the television monitor, the player feels a sense of trouble when the moving direction of the character is inverted.

Therefore, it is a primary feature of the present invention to provide a novel game system.

Another feature of the exemplary embodiments is to provide a game system and game program capable of improving the operability of a game utilizing a direction instructing key.

A game system according to the exemplary embodiments displays a game world in which a plurality of characters including a player character operated by a direction instructing key (a reference number indicative of a corresponding component in an embodiment: 10*c*, and so forth) appear on a common display (300) and an individual display (20) assigned to the player. A first display mechanism (S215) displays on the individual display the game world at a first viewpoint with reference to the player character, and second display mechanism (S115, S137) displays on the common display the game world at a second viewpoint capable of viewing the plurality of characters. When a selection key (10*a*, 10*b*) for selecting one of the common display and the individual display as an operation screen is operated, a switching mechanism (S121, S127) switches a setting of the operation screen. When the direction instructing key is operated, a moving mechanism (S133, S235) moves the player character to a moving direction based on a viewpoint of the game world displayed on the operation screen and a direction instructed by the direction instructing key.

Thus, any one of the common display and the individual display is selected as the operation screen, the player character moves in a direction based on the viewpoint of the game world displayed on the operation screen and a direction instructed by the direction instructing key, and therefore, operability of the game utilizing the direction instructing key can be improved.

Preferably, when the individual display is set as the operation screen, the moving direction is determined based on the first viewpoint and the direction indicated by the direction instructing key, and when the common display is set as the operation screen, the moving direction is determined based on the second viewpoint and the direction indicated by the direction instructing key.

In a case a memory storing the position information of the player character is provided, the individual display is displayed with the game world with reference to a position according to the position information, and the common display is displayed with the game world so that the player character exists at the position according to the position information. Herein, the display manner of the game world is preferably changed by renewing the position information of the memory based on the moving direction.

At least a map of the game world capable of viewing a position of the player character may be displayed on the individual display at a second viewpoint. It is noted that display/non-display of the map is controlled in accordance with a setting of the operation screen in one embodiment. Emphasis/non-emphasis of the map is controlled in accordance with the setting of the operation screen in another embodiment.

As a method of controlling the map emphasis/non-emphasis, there are methods of enlarging the map when the common display is set as the operation screen and reducing the map when the individual display is set as the operation screen, and methods of emphasizing a coloring of the map more than the coloring of the game world when the common display is set as the operation screen and emphasizing the coloring of the game world more than the coloring of the map when the individual display is set as the operation screen.

In an embodiment where the plurality of individual displays, the plurality of direction instructing keys and the plurality of selection keys respectively assigned to the plurality of player characters are provided, the individual displays of each of the players are displayed with the game world at a first viewpoint with reference to each of the player characters. The switching mechanism switches the setting of each of the operation screens in response to the operation of each of the selection keys. When each of the direction instructing keys is operated, each of the player characters moves to a direction based on the viewpoint of the game world displayed on each of the operation screens.

A game system according to an exemplary embodiment has the video game machine (200) connected to the common display (300) and the portable game machine (100) having the individual display (20) and the direction instructing key (10*c*), and displays the game world in which the plurality of characters including the player character operated by the portable game machine appear on the common display and the individual display. In the portable game machine, a first display mechanism (S215) displays on the individual display the game world at the first viewpoint with reference to the player character. When the selection key (10*a*, 10*b*) for selecting one of the common display and the individual display as the operation screen is operated, a first moving mechanism (S235) moves the player character to the first moving direction based on the viewpoint of the game world displayed on the operation screen and the direction instructed by the direction instructing key. On the other hand, in the video game machine, a second display mechanism (S115, S137) displays on the common display the game world at the second viewpoint capable of viewing the plurality of characters. The switching mechanism (S121, S127) switches the setting of the operation screen in response to an operation of the selection keys, and the second moving mechanism (S133) moves the player character to the moving direction based on the viewpoint of the game world displayed on the operation screen and the direction instructed by the direction instructing key when the direction instructing key is operated.

Thus, any one of the common display and the individual display can be selected as the operation screen by the portable game machine, and when the direction instructing key is operated, one's character is moved to the moving direction based on the viewpoint of the game world displayed on the operation screen and the direction instructed by the direction instructing key. Therefore, the operability of the game utilizing the direction instructing key can be improved.

The portable game machine preferably comprises a direction data transmitting mechanism for transmitting direction data to the video game machine in response to an operation of the direction instructing key and a first memory for storing position information of the player character. Preferably, the video game machine further comprises a second memory for storing position information of the player character and a position information transmitting mechanism for transmitting position information stored in the second memory to the portable game machine when the position information is renewed. The first moving mechanism renews the position information stored in the first memory by the position information transmitted from the video game machine, and the second moving mechanism renews the position information stored in the second memory based on the direction data transmitted form the portable game machine.

More preferably, the first display mechanism displays the game world with reference to a position according to the position information stored in the first memory, and the second display mechanism displays the game world so that the player character exists at a position according to the position information stored in the second memory.

The portable game machine may be displayed with a map at the second viewpoint of the game world capable of viewing at least a position of the player character on the individual display. It is noted that display/non-display of the map is controlled in accordance with the setting of the operation screen in one embodiment. Furthermore, emphasis/non-emphasis of the map is controlled in accordance with the setting of the operation screen in another embodiment.

The exemplary embodiments also include a method of enlarging the map when the common display is set as the operation screen and reducing the map when the individual display is set as the operation screen, as a method of controlling the emphasis/non-emphasis.

A game system according to the exemplary embodiments has the video game machine (200) connected to the common display (300) and the portable game machine (100) having the individual display (20), and displays the game world in which the plurality of characters including the player character operated by the portable game machine (100) appear on the common display and the individual display. In the portable game machine, a first memory (18) stores the position information of the player character. A first display mechanism (S215) displays the game world on the individual display at the first viewpoint with reference to the player character based on the position information stored in the first memory. When the switching instructing key (10*a*, 10*b*) is operated for instructing switching of the operation screen between the common display and the individual display, a switching instructing information transmitting mechanism (S219, S225) transmits switching instructing information to the video game machine. When the direction instructing key (10*c*) for instructing moving of the player character in an arbitrary direction is operated, a direction instructing information transmitting mechanism (S231) transmits the direction instructing information to the video game machine. When a position information receiving mechanism (S233) receives the position information of the player character from the video game machine, a rewriting mechanism (S235) rewrites the position information held in the first memory by the received position information. On the other hand, in the video game machine, the second memory (40) stores position information of the player character. The second display mechanism (S115, S137) displays the game world on the common display at the second viewpoint capable of viewing the plurality of characters including the player character based on the position information stored in the second memory. When a switching instructing information receiving mechanism (S117, S123) receives the switching instructing information from the portable game machine, the switching mechanism (S121, S127) switches a setting of the operation screen according to the received switching instructing information. Furthermore, when a direction instructing information receiving mechanism (S129) receives the direction instructing information from the portable game machine, a renewal mechanism (S133) renews the position information of the player character held in the second memory on the basis of the received direction instructing information and the setting of the operation screen. A position information transmitting mechanism (S135) transmits the renewed position information to the portable game machine.

Thus, the direction instructing key is operated, the position information of the character is renewed based on the instructed direction and the setting of the operation screen, and the game worlds of the common display and the individual display are renewed on the basis of the renewed information. Accordingly, it is possible to improve the operability of the game utilizing the direction instructing key.

The position information is preferably renewed such that the player character moves in the moving direction based on the viewpoint of the game world displayed on the display screen and the direction indicated by the direction instructing key.

In an embodiment where case the plurality of portable game machines and the plurality of player characters are individually operated, the first memory of each of portable game machines is stored with the position information of the plurality of player characters. One's individual display of each of the portable game machines is displayed with the game world at the first viewpoint with reference to one's player character. Each of the portable game machines receives the position information of the player characters from the video game machine, and the received position information is stored in the first memory of the portable game machine. On the other hand, the video game machine displays on the common display the game world at the second viewpoint capable of viewing the player characters. Furthermore, when the switching instructing information is received, the setting of the operation screen of the transmission source is switched, and when the direction instructing information is received, the position information of the player character operated by the transmission source is renewed based on the received direction instructing information and the setting of the operation screen of the transmission source. The renewed position information is transmitted to each of the portable game machines.

A game program product according to an exemplary embodiment involves the video game machine (200) connected to the common display (300) and the portable game machine (100) provided with the individual display (20), and displays the game world in which the plurality of characters including the player character operated by the portable game machine appear on the common display and the individual display. Thus, the portable game machine executes a step for storing the position information of the player character in the first memory (S211), a step for displaying the game world on the individual display at the first viewpoint with reference to the player character based on position information stored in the first memory (S215), a step for accepting an operation of the switching instructing keys (10a, 10b) for instructing switching of the operation screen between the common display and the individual display (S217, S223), a step for accepting an operation of the direction instructing key (10c) for instructing moving of the player character to an arbitrary direction (S29), a step for transmitting the switching instructing information to the video game machine when the switching instructing key is operated (S219, S225), a step for transmitting the direction instructing information to the video game machine when the direction instructing key is operated (S231), a step for receiving position information of the player character from the video game machine (S233), and a step for rewriting the position information held in the first memory by the received position information (S235). On the other hand, the video game machine executes a step for storing position information of the player character in the second memory (S113), a step for displaying the game world on the common display at the second viewpoint capable of viewing the plurality of characters including the player character based on the position information stored in the second memory (S115, S137), a step for receiving the switching instructing information from the portable game machine (S117, S123), a step for receiving the direction instructing information from the portable game machine (S129), a step for switching a setting of the operation screen according to the received switching instructing information (S121, S127), a step for renewing the position information of the player character held in the second memory on the basis of the received direction instructing information and the setting of the operation screen (S133), and a step for transmitting the renewed position information to the portable game machine (S135).

Thus, when the direction instructing key is operated, the position information of the character is renewed based on the instructed direction and the setting of the operation screen, and the game worlds of the common display and the individual display are renewed based on the renewed information. Accordingly, it is possible to improve the operability of the game utilizing the direction instructing key.

The above described features, aspects and advantages of the present invention will become more apparent from the following detailed description of the present invention when taken in conjunction with the accompanying drawings.

BRIEF DESCRIPTION OF THE DRAWINGS

FIG. 4(A) is an illustrative view showing one example of an individual game screen displayed on the LCD when the individual game screen is an operation screen;

FIG. 4(B) is an illustrative view showing another example of the individual game screen displayed on the LCD when the individual game screen is the operation screen;

FIG. 4(C) is an illustrative view showing the other example of the individual game screen displayed on the LCD when the individual game screen is the operation screen;

FIG. 7 is an illustrative view showing one example of a game program/data stored in a DVD-ROM;

FIG. 8 (A) is an illustrative view showing game world data for a video game machine;

FIG. 8 (B) is an illustrative view showing character data for the video game machine;

FIG. 9 (A) is an illustrative view showing game world data for a portable game machine;

FIG. 9 (B) is an illustrative view showing map data for the portable game machine;

FIG. 9 (C) is an illustrative view showing character data for the portable game machine;

FIG. 10 is an illustrative view showing one example of a table formed on a RAM of the video game machine;

FIG. 11 is an illustrative view showing one example of a table formed on a RAM of the portable game machine;

FIG. 21(A) is an illustrative view showing one example of the individual game screen displayed on the LCD in the prior art; and FIG. 21(B) is an illustrative view showing another example of the individual game screen displayed on the LCD in the prior art.

DETAILED DESCRIPTION OF THE PREFERRED EMBODIMENTS

Figure 1:
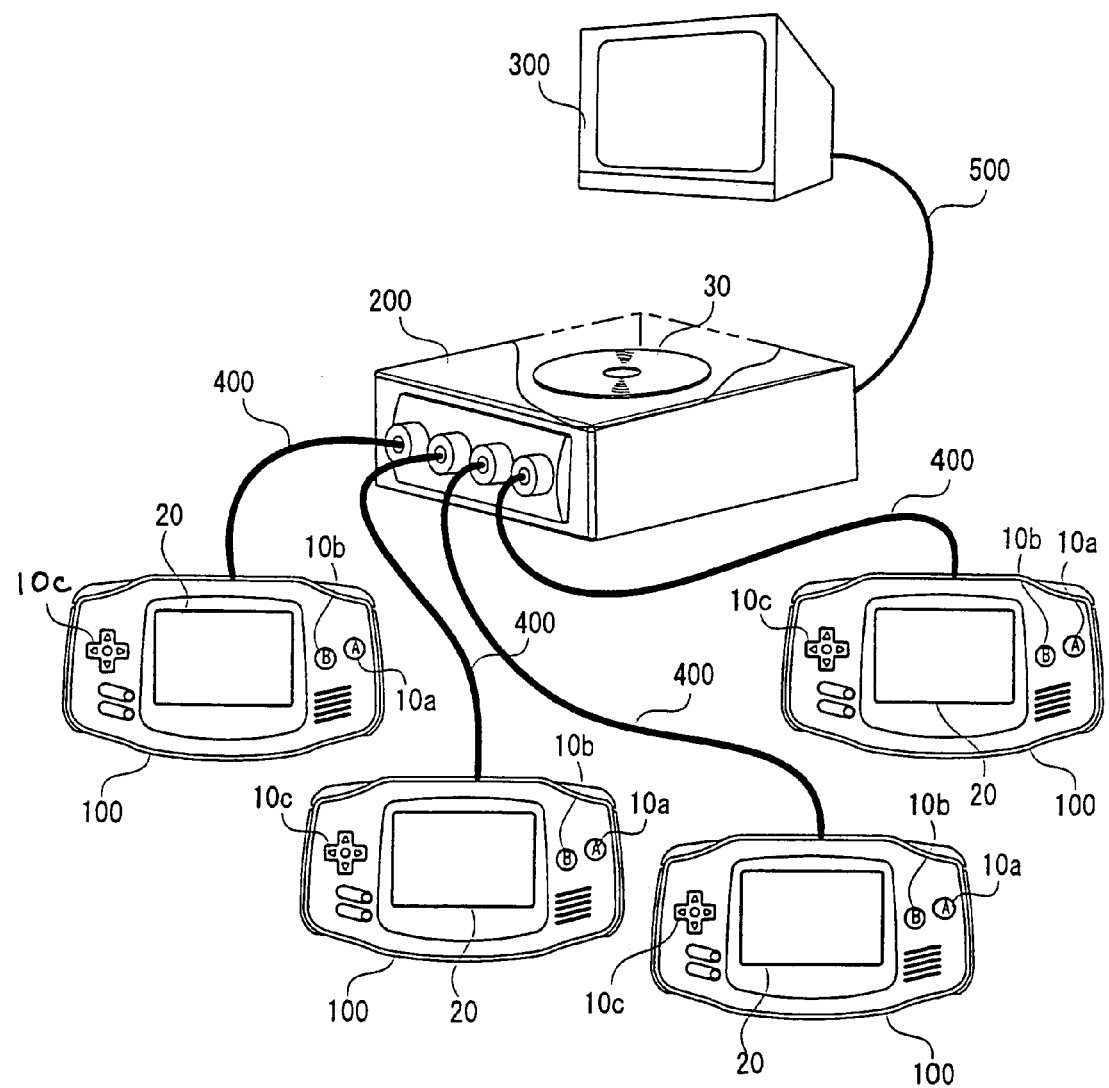
FIG. 1 is an illustrative view showing one embodiment of the present invention.

Referring to FIG. 1, a game system of this embodiment includes a plurality of portable game machines 100, 100, . . . (four in this embodiment) and one video game machine 200. The video game machine 200 is individually connected to the portable game machines 100, 100, . . . using connection cables 400, 400, . . . and is connected to a CRT 300 using a video cable 500. A DVD-ROM 30 stored with a game program is attached to the video game machine 200. The game program is executed by the video game machine 200 and each portable game machine 100, whereby a predetermined game world is provided to players. Each game machine 100 is utilized as a game controller, and each player performs a game operation by one's portable game machine 100.

It is noted that in this exemplary embodiment the video game machine 200 and the portable game machine 100 are respectively game machines "NINTENDO GAME CUBE (trademark)" and "GAME BOY ADVANCE (trademark)" manufactured and sold by the applicants' assignee of the present invention.

The game world is displayed on an LCD 20 provided on each portable game machine 100 and the CRT 300. Each LCD 20 is displayed with a different game world (individual game screen) every player, and the CRT 300 is displayed with a common game world (common game screen) common to each player. That is, the LCD 20 functions as an individual display, the CRT 300 functions as a common display, and therefore, each player executes a game viewing the CRT 300 and one's LCD 20.

A plurality of player characters Ch1 to Ch4 appear in a three-dimensional space shown in FIG. 2 in the game of this embodiment (hereinafter "player character" is referred merely to as "character"). The characters Ch1 to Ch4 are operatively assigned to the respective portable game machines 100, 100, . . . one by one, and each player moves one's character to an arbitrary direction utilizing a direction instructing key (cross key) 10c provided on the portable game machine 100.

Figure 2:
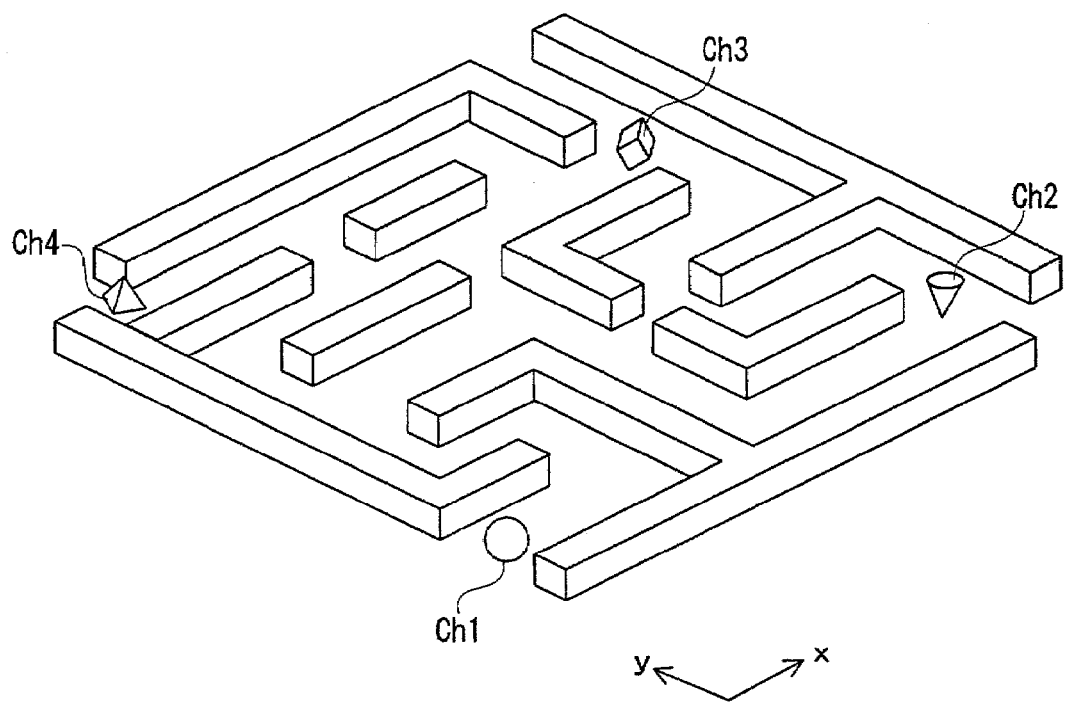
FIG. 2 is a perspective view showing one example of a game world.
Figure 3:
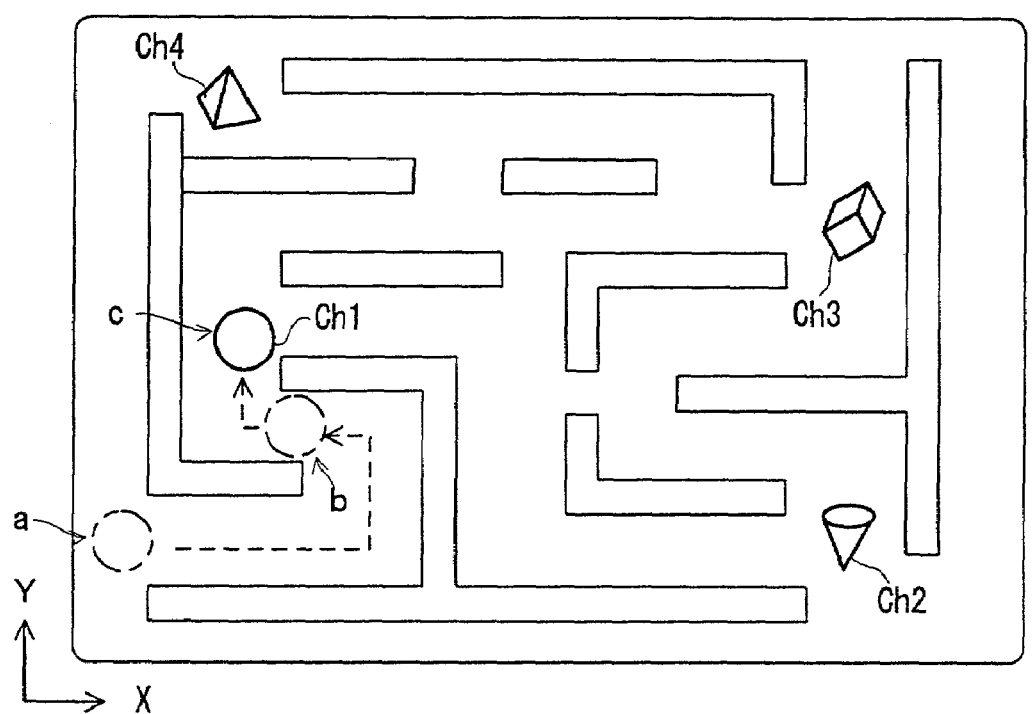
FIG. 3 is an illustrative view showing one example of a common game screen displayed on a CRT.

The common game screen displayed on the CRT 300 is formed by a two-dimensional space shown in FIG. 3. That is, a plane image based on a viewpoint (second viewpoint) viewing the three-dimensional space shown in FIG. 2 from directly above is displayed on the CRT 300, and therefore, where the characters C1 to C4 exist can be recognized by this plane image. On the other hand, the three-dimensional space based on a viewpoint (first viewpoint) viewing from a rear oblique upper position of one's character is displayed on the LCD 20 of the portable game machine 100. Specifically, the three-dimensional space extending forward one's character is displayed on the individual game screen. Accordingly, when the character Ch1 is moved in order of position a→position b→position c, a display of the LCD 20 of the portable game machine 100 which operates the character Ch1 is changed as shown in a manner of FIG. 4 (A)→FIG. 4 (B)→FIG. 4 (C).

Where each player operates an A button 10a or a B button 10b provided on the portable game machine 100, the operation screen is switched between the common game screen and one's individual game screen. Specifically, where the A button 10a is selected, the common game screen is selected as the operation screen, and where the B button 10b is selected, one's individual game screen is selected as the operation screen. An operation required to move the character Ch1 from the position a to the position c is different between the case the common game screen is selected as the operation screen and the case one's individual game screen is selected as the operation screen.

In a case the common game screen is the operation screen (referring to FIG. 3), the character Ch1 is moved from the position A to the position B by operating the direction instructing key 10c in order of right→right→right→upper→left. Furthermore, the character Ch1 is moved from the position B to the position C by operating the direction instructing key 10c in order of left→upper. On the other hand, in a case one's individual game screen is the operation screen (referring to FIG. 4(A) to FIG. 4 (C)), the character Ch1 is moved from the position A to the position B by operating the direction instructing key 10c in order of upper→upper→upper→left→left. Furthermore, the character Ch1 is moved from the position B to the position C by operating the direction instructing key 10c in order of upper→right.

Figure 5:
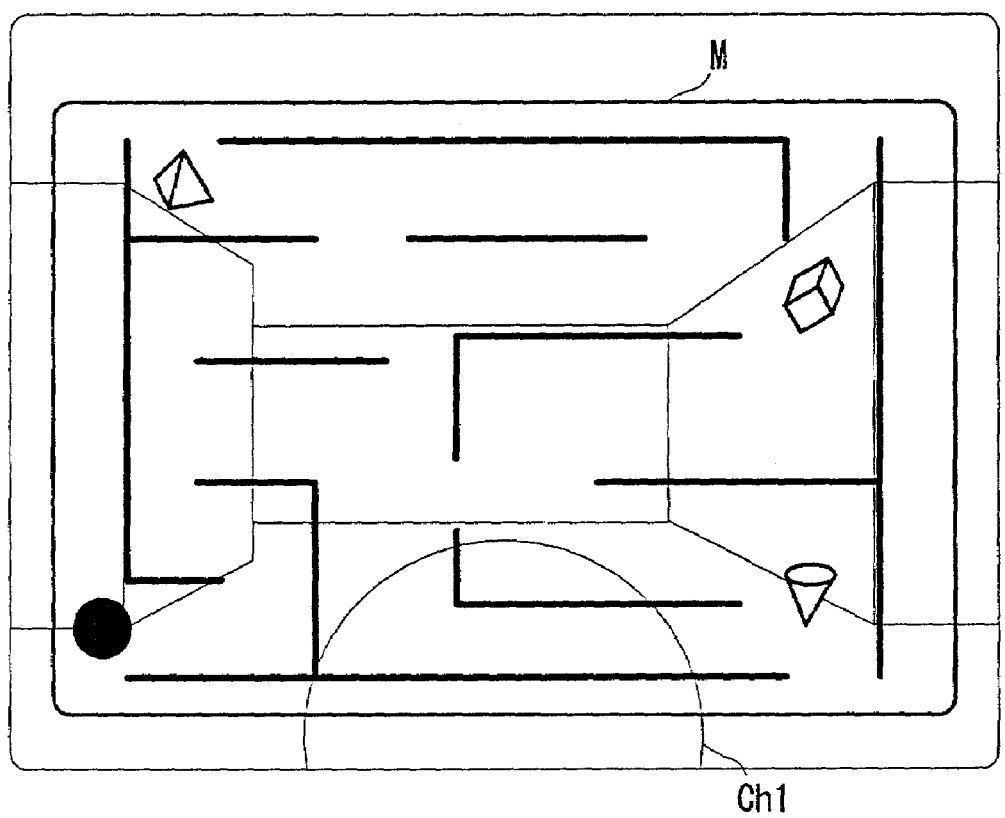
FIG. 5 is an illustrative view showing one example of an individual game screen displayed on the LCD when the common game screen is the operation screen.

A map M simplifying the game world is also displayed on the individual game screen. The map M is displayed at the same viewpoint as the plane image shown in FIG. 3, and all characters Ch1 to Ch4 also appear on the map M. A display manner of the map M is switched between FIGS. 4 (A) to 4 (C) and FIG. 5 in accordance with the setting of the operation screen. That is, where the individual game screen is the operation screen, the map M is displayed in a reduced manner at the upper of the screen as shown in FIG. 4 (A) to FIG. 4 (C), and where the common game screen is the operation screen, the map M is displayed in an enlarged manner at the center of the screen as shown in FIG. 5. Such the emphasis or non-emphasis of the map M allows the operator to smoothly progress the game with viewing only the individual game screen.

Figure 6:
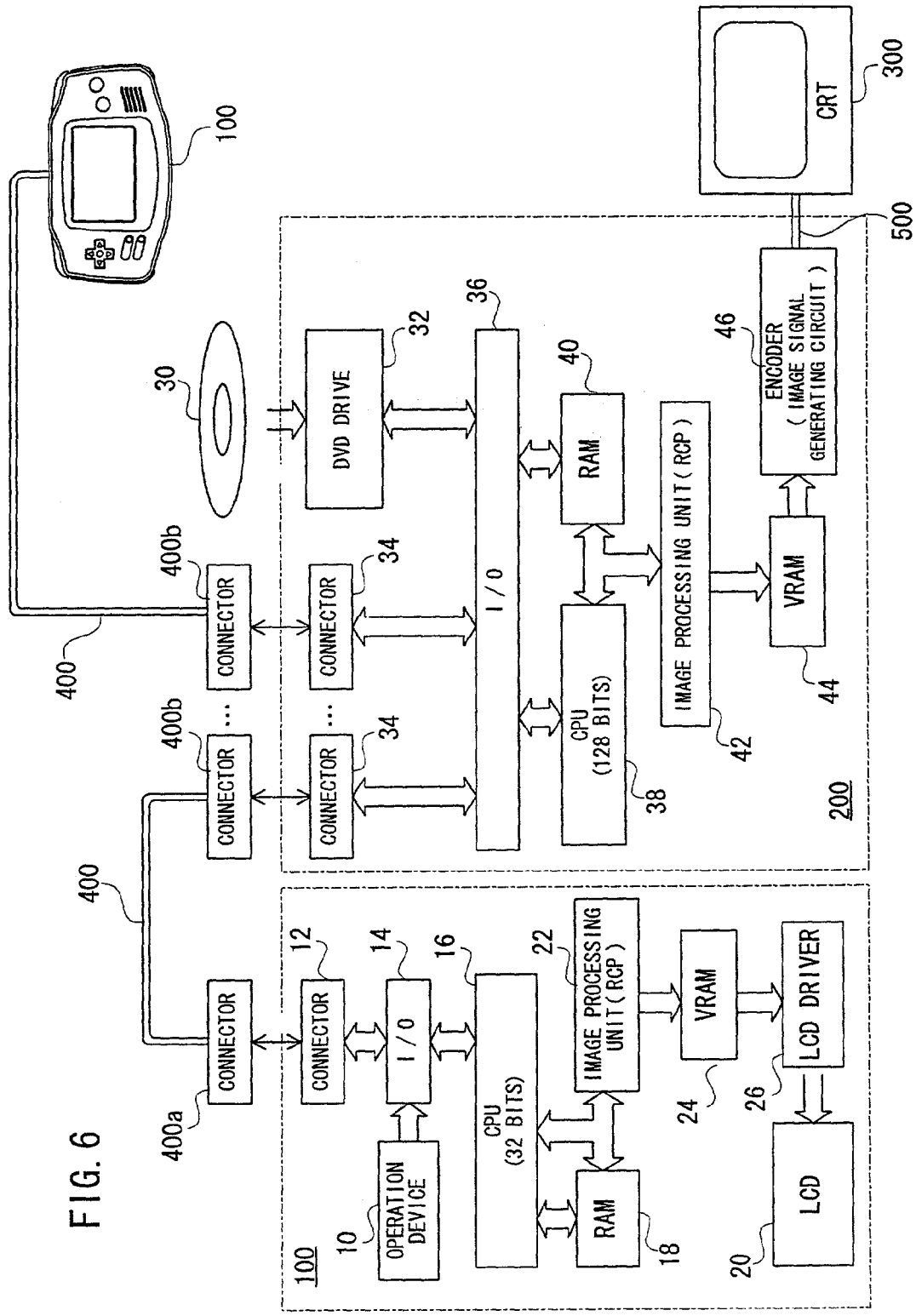
FIG. 6 is a block diagram showing one example of a configuration of FIG. 1 embodiment.

The portable game machine 100 and the video game machine 200 are specifically constructed as shown in FIG. 6. The portable game machine 100 is provided with a connector 12, and the video game machine 200 is provided with a plurality of connectors 34, 34, . . . . The connector 12 is connected to a CPU 16 via an I/O interface 14, and the connector 34 is connected to a CPU 38 via an I/O interface 36. Connectors 400a and 400b provided at both ends of the connector 400 are connected to the connectors 12 and 34, respectively, and therefore, communication between the CPU 16 and the CPU 38 can be established.

The I/O interface 36 of the video game machine 200 is connected with a DVD drive 32. The DVD ROM 30 is stored with game program/data for the video game machine 200 and game program/data for the portable game machine 100 as shown in FIG. 7, and these program/data are read out by the DVD drive 32.

Referring to FIG. 7, the game program/data for the video game machine 200 includes a program for program transfer PGC1, a display control program PGC2, a key information receiving program PGC3, a position information renewal program PGC4, a position information transmitting program PGC5, game world data DGC1, character data DGC2, and etc. Furthermore, the game program/data for the portable game machine 100 includes a display control program PGB1, a key information transmitting program PGB2, a position information receiving program PGB3, a position information renewal program PGB4, game world data DGB1, map data DGB2, character data DGB3, and etc.

The program for program transfer PGC1 is a program for transferring the game program/data for the portable game machine 100 to each portable game machine 100. The display control program PGC2 is a program for displaying the common game screen shown in FIG. 3 on the CRT 300 on the basis of the game world data DGC1, the character data DGC2 and the position information. The key information receiving program PGC3 is a program for receiving key information (A button data, B button data or direction data) transmitted from the portable game machine 100. The position information renewal program PGC4 is a program for renewing the position information of the characters Ch1 to Ch4 according to the received key information. The position information transmitting program PGC5 is a program for transmitting the renewed position information to each portable game machine 100.

The game world data DGC1 is data for reproducing the game world on the CRT 300 and is, for example, drawn in a two-dimensional manner as shown in FIG. 8 (A).

The character data DGC2 is data for reproducing the characters Ch1 to Ch4 in the game world and is, for example, drawn in a three-dimensional manner as shown in FIG. 8 (B).

Returning to FIG. 7, the display control program PGB1 included in the game program/data for the portable game machine 100 is a program for displaying the individual game screen shown in FIGS. 4 (A) to 4 (C) or FIG. 5 on one's LCD 20 on the basis of the game world data DGB1, the map data DGB2, the character data DGB3, and the position information. The key information transmitting program PGB2 is a program for transmitting, to the video game machine 200, the key information indicative of which one of the A button 10a, the B button 10b and the direction instructing key 10c is operated. The position information receiving program PGB3 is a program for receiving the position information transmitted from the video game machine 200. The position information renewal program is a program for renewing current position information by the received position information.

The game world data DGB1 is data for reproducing the game world on one's LCD 20 and is drawn in the three-dimensional manner as shown in FIG. 9(A). The map data DGB2 is data for displaying the map of the game world on one's LCD 20 and is drawn in the two-dimensional manner as shown in FIG. 9 (B). The viewpoint of the map based on the map data is the same as the viewpoint of the game world based on the game world data shown in FIG. 8 (A). The character data DGB3 is data for reproducing the characters Ch1 to Ch4 in the game world or the map, and is drawn in the three-dimensional manner as shown in FIG. 9 (C).

Returning to FIG. 6, the game program/data for the video game machine 200 is stored in a RAM 40. The RAM 40 is also formed with a table 40a holding the position information of the characters Ch1 to Ch4 and an operation screen flag for determining the operation screen of each portable game machine 100. According to FIG. 10, the position information is constructed by posture data (moving direction data) and location data of the characters. Furthermore, where the operation screen flag is set, the CRT 300 is determined to be the operation screen, and where the operation screen flag is reset, one's LCD 20 is determined to be the operation screen.

The CPU 38 executes the program for program transfer PGC1 and transfers the game program/data for the portable game machine 100 to each portable game machine 100. When the game is started, the CPU 38 executes the above-described programs PGC2 to PGC 5. First, the CPU 38 requests an image processing unit 42 to execute image processing so as to display on the CRT 300 the common game screen in an initialized state. When the key information is received from the portable game machine 100, the CPU 38 renews the position information or the operation screen flag of the table 40a according to the key information. When the position information is renewed, the CPU 38 transmits the renewed position information to each portable game machine 100, and requests the image processing unit 42 to renew any one position of the characters Ch1 to Ch4.

The image processing unit 42 draws the game world in a VRAM 44 on the basis of the game world data DGC1 stored in the RAM 40 and draws the characters Ch1 to Ch4 in the VRAM 44 on the basis of the character data DGC2 stored in the RAM 40 and the position information of the table 40a. Herein, each of the characters Ch1 to Ch4 is disposed at a position indicated by the location data and directed to a direction indicated by the posture data.

An encoder 46 reads out image data formed by the game world and the characters Ch1 to Ch4 from the VRAM 44, and converts the read image data to a composite image signal. The converted composite image signal is applied to the CRT 300 via the video cable 500, and whereby, the common game screen shown in FIG. 3 is displayed on the CRT 300.

The game program/data for the portable game machine 100 transmitted to the portable game machine 100 is stored in a RAM 18 by the CPU 16. The RAM 18 is also formed with a table 18a as shown in FIG. 11. According to FIG. 11, the position information of the characters Ch1 to Ch4 is held in the table 18a.

When the game is started, the CPU 18 requests the image processing unit 22 to execute image processing so as to display on the LCD 20 the individual game screen in an initial state. When any one of the A button 10a, the B button 10b and the direction instructing key 10c is operated, the CPU 18 transfers the key information to the video game machine 200. Furthermore, in receiving the position information from the video game machine 200, the CPU 18 rewrites the position information of the table 18a by the received position information, and requests the image processing unit 22 to renew the image.

The image processing unit 22 draws an image of three-dimensional space viewed from a rear oblique upper position of one's character and a map image in a VRAM 24 on the basis of the game world data DGB1, the map data DGB2 and the character data DGB3 stored in the RAM 18, and the position information of one's character stored in the table 18a. At this time, where the operation screen is the CRT 300, the reduced map image is drawn, and where the operation screen is the LCD 20, the enlarged map image is drawn. An LCD driver 26 drives the LCD 20 in accordance with the image data drawn in the VRAM 24, and therefore, the individual game screen shown in FIGS. 4 (A) to 4 (C) or FIG. 5 is displayed on the LCD 20.

Specifically, the CPU 38 of the video game machine 200 and the CPU 16 of the portable game machine 100 process flowcharts shown in FIG. 12 to FIG. 17. It is noted that processing of the CPU 38 is executed according to the game program/data for the video game machine, and processing of the CPU 16 is executed according to the game program/data for the portable game machine.

Figure 12:
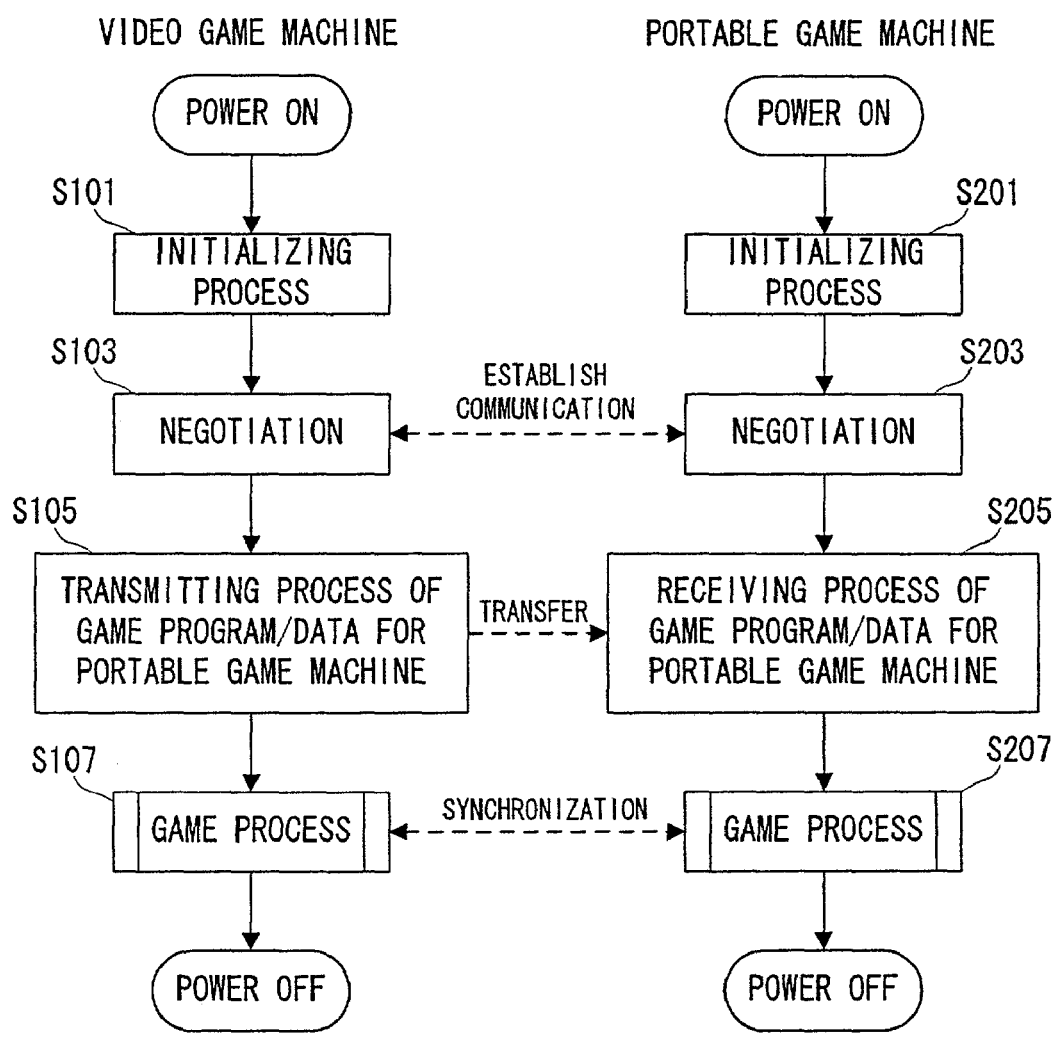
FIG. 12 is a flowchart showing a part of an operation of the video game machine and the portable game machine.
Figure 13:
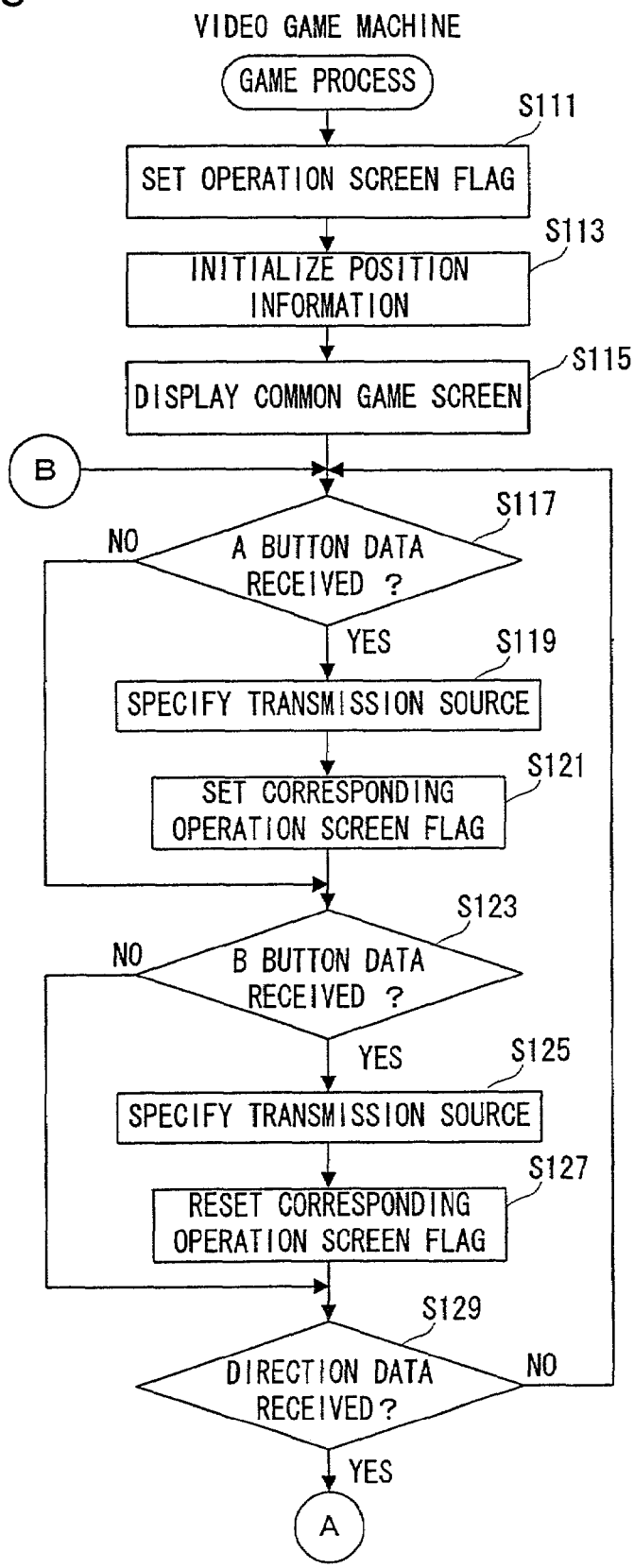
FIG. 13 is a flowchart showing another part of the operation of the video game machine.
Figure 14:
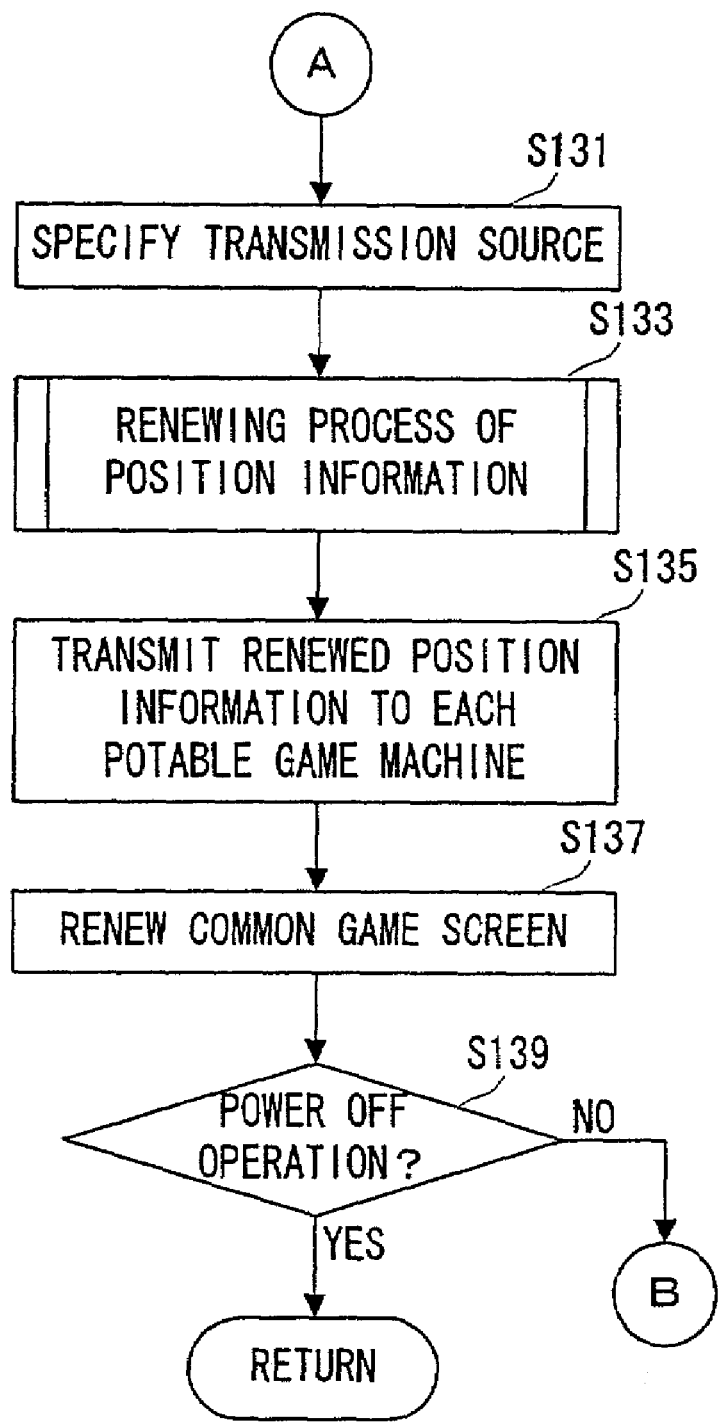
FIG. 14 is a flowchart showing the other part of the operation of the video game machine.

Referring to FIG. 12 first, the CPU 38 of the video game machine 200 performs initializing processing in a step S101, and performs a negotiation for establishing communication between respective portable game machines 100, 100, . . . in a step S103. When the communication is established, the game program/data for the portable game machine is transmitted to each portable game machine 100 in a step S105, and after completion of the transmitting processing, a game process is executed in a step S107. When a power off operation is performed in the middle of the game process, the process is completed.

The CPU 16 of the portable game machine 100 also performs the initializing processing in a step S201, and performs the negotiation processing between the video game machine 200 in a step S203. When the communication is thus established, the process proceeds to a step S205, and then, receiving processing of the game program/data transmitted from the video game machine 200 is performed. After completion of the receiving processing, the game process is performed in a step S207, and when the power off operation is performed in the middle of the game process, the process is completed.

The game process in the step S107 complies with subroutines shown in FIG. 13 to FIG. 16. First, all operation screen flags held in the table 40a shown in FIG. 10 are set in a step S111, and all position information held in the same table 40a are initialized in a step S113. Setting the operation screen flag allows each of the portable game machines 100, 100, . . . to select the LCD 20 for the operation screen. Furthermore, the initialization of the position information allows each of the characters Ch1 to Ch4 to be directed to a predetermined direction at a predetermined position. A processing requirement is applied to the image processing unit 42 so as to display the common game screen on the CRT 300 in a step S115. The CRT 300 is displayed with the common game screen shown in FIG. 3.

It is determined whether or not the A button data is received in a step S117, it is determined whether or not the B button data is received in a step S123, and it is determined whether or not the direction data are received in a step S129. When the A button data is received, "YES" is determined in the step S117, and it is specified that from which portable game machines 100, 100, the A button data is transmitted in a step S119 (specification of the transmission source). In a following step S121, the table 40a shown in FIG. 10 is accessed, and the operation screen flag assigned to the portable game machine 100 of the transmission source is set.

When the A button data is transmitted from the portable game machine 100 operating the character Ch1, the operation screen flag of the character Ch1 is set.

When the B button data is received, the process proceeds from the step S123 to a step S125 so as to specify the transmission source of the B button data. In a step S127, the operation screen flag assigned to the portable game machine 100 of the transmission source is reset contrary to the step S121. Where the operation screen flag is set, the CRT 300 functions as the operation screen, and where the operation screen flag is reset, one's LCD 20 functions as the operation screen.

When the direction data is received, the process proceeds from the step S129 to a step S131 so as to specify the transmission source of the direction data as above-described manner. In a step S133, the position information assigned to the portable game machine 100 of the transmission source is renewed in accordance with the subroutines shown in FIG. 15 and FIG. 16. After completion of the renewal processing, the renewed position information is transmitted to each portable game machine 100 in a step S135. In a following step S137, so as to renew the common game screen according to the renewed position information, a corresponding processing request is applied to the image processing unit 22. A character, i.e. an operation object of the portable game machine 100 of the transmission source is moved to the direction according to the renewed position information. It is determined whether or not a power off operation is performed in a step S139, and if "No" is determined, the process returns to the step S117, however; if "YES" is determined, the process is restored to a hierarchical upper level of a routine.

Figure 15:
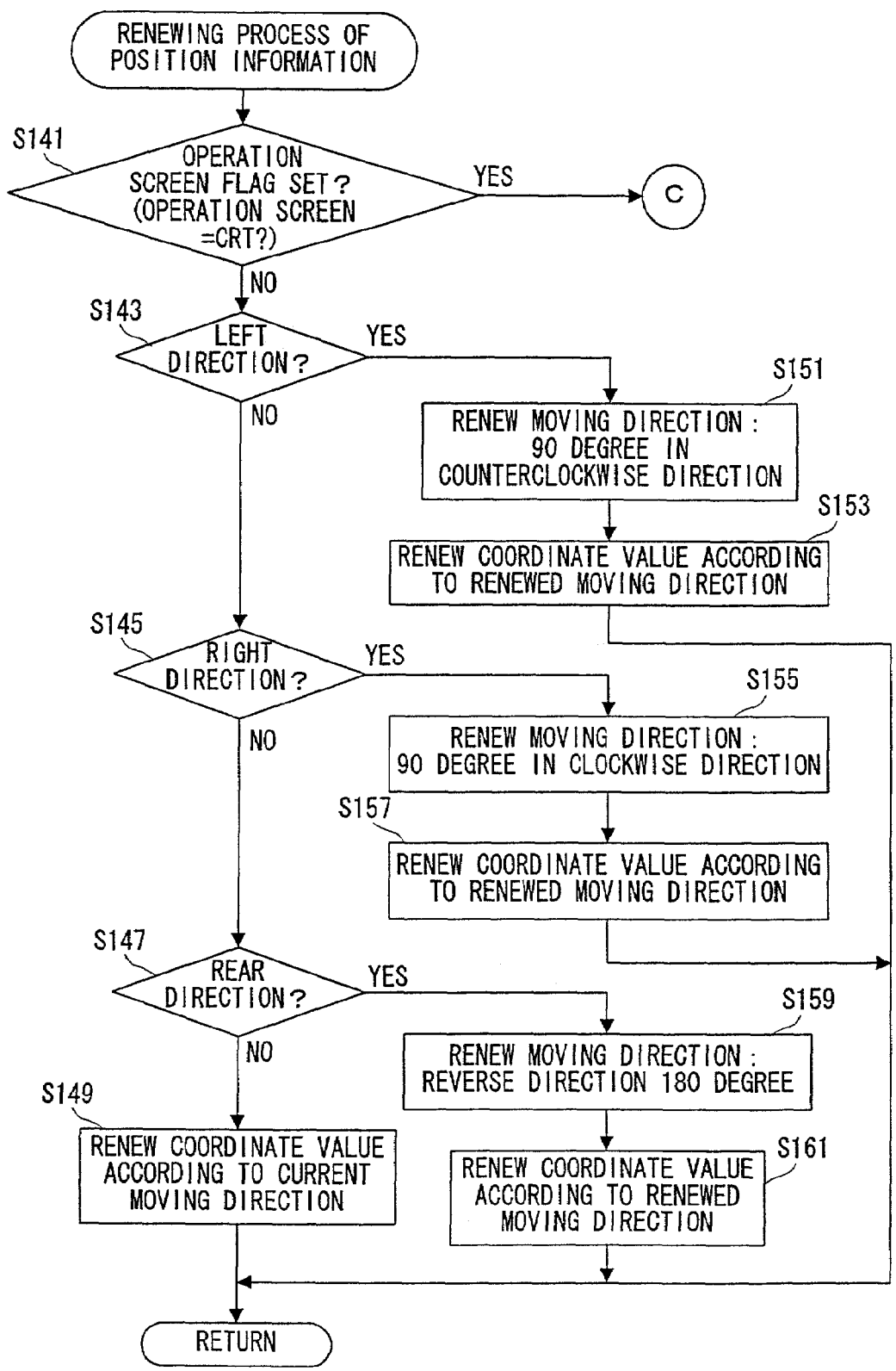
FIG. 15 is a flowchart showing further part of the operation of the video game machine.
Figure 16:
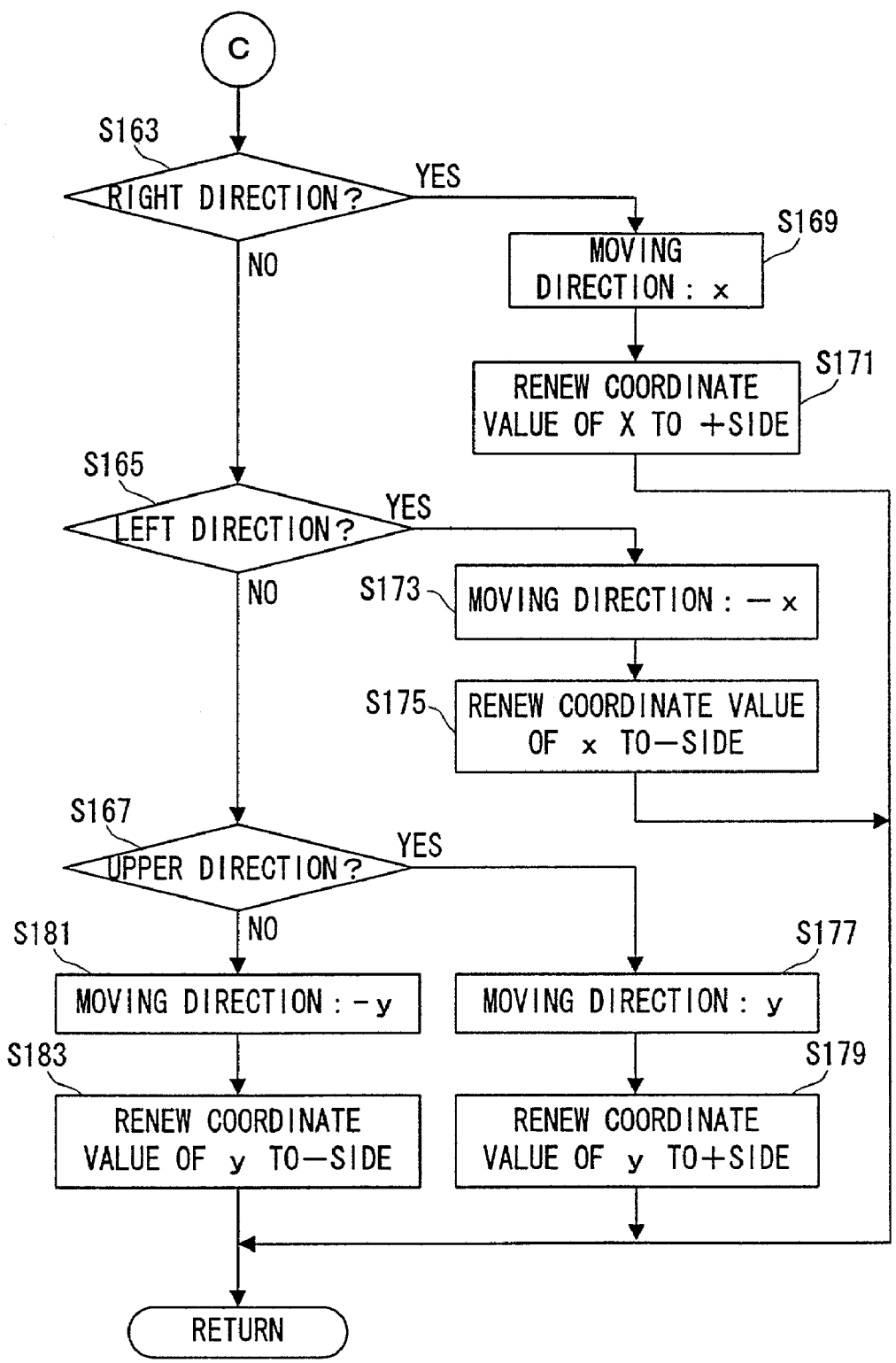
FIG. 16 is a flowchart showing another part of the operation of the video game machine.

Referring to FIG. 15 and FIG. 16, the renewal processing of the position information will be described. In a step S141 first, the table 40a shown in FIG. 10 is accessed and a state of the operation screen flag assigned to the transmission source of the direction data is determined. If the operation screen flag is in a reset state (i.e. the LCD 20 is the operation screen), processes from steps S143 to S161 are executed, however; if the operation screen flag is in a set state (i.e. the CRT 300 is the operation screen), processes from steps S163 to S183 are executed.

A direction indicated by the direction data is determined in the steps S143, S145 and S147. If the direction data indicates "left direction (left side of the direction instructing key 10c)", "YES" is determined in the step S143, and the position information assigned to the transmission source is renewed in respective steps S151 and S153. A direction or posture indicated by the position information (moving direction) is rotated 90 degrees in a counterclockwise direction in the step S151, and a location indicated by the position information (a coordinate value) is renewed according to the renewed moving direction in the step S153. For example, when the direction data indicative of the "left direction" is received from the portable game machine 100 operating the character Ch1 in a state (a state A) that the direction data and the location data of the position information of the character Ch1 indicate "X" and (x, y)=(0, 0), respectively, the direction data is renewed form "x" to "y" and the location data is renewed to (x, y)=(0, 1).

When the direction data indicates "right direction (right side of the direction instructing key 10c)", "YES" is determined in the step S145, and the direction data indicated by the position information is rotated 90 degrees in a clockwise direction in the step S155. Then, the location data indicated by the position information is renewed according to the renewed moving direction in the step S157. When the direction data indicative of "right direction" is received from the portable game machine 100 operating the character Ch1 in the above described state A, the direction data and the location data (x, y) indicated by the position information of the character Ch1 are renewed from "x" to "−y" and from (0, 0) to (0, −1), respectively.

When the direction data indicates "rear direction (lower side of the direction instructing key 10*c*)", "YES" is determined in the step S147, the direction data indicated by the position information is inverted 180 degrees in the step S159, and the location data indicated by the position information is renewed in accordance with the renewed moving direction in the step S161. When the direction data indicative of "rear direction" is received from the portable game machine 100 operating the character Ch1 in the above described state A, the direction data and the location data (x, y) indicated by the position information of the character Ch1 are renewed from "x" to "−x" and from (0, 0) to (−1, 0), respectively.

When the direction data indicates "forward direction (upper side of the direction instructing key 10*c*)", the process proceeds from the step S147 to the step S149, and the location data indicated by the position information is renewed in accordance with a current moving direction. When the direction data indicative of "forward direction" is received from the portable game machine 100 operating the character Ch1 in the above described state A, the position data (x, y) is renewed from (0, 0) to (1, 0) without renewing the direction data.

The individual game screen displayed on one's LCD 20 is changed according to the moving of one's character. Accordingly, where the individual game screen is the operation screen, the renewed moving direction is determined with reference to the current moving direction of the character. Furthermore, which one of "x" or "y" forming the location data is to be renewed is determined depending on x/y of the renewed direction data, and whether "1" is added or subtracted is determined depending on +/−of the renewed direction data. After completion of the step S153, S157, S161, or S149, the process is restored to the hierarchical upper level of the routine.

A direction indicated by the direction data is also determined in steps S163, S165 and S167 shown in FIG. 16. If the direction data indicates "right direction (right side of the direction instructing key 10*c*)", "YES" is determined in the step S163, the direction data indicated by the position information is set into "x" in the step S169, and the location data "x" indicated by the position information is renewed by "1" to the plus (+) side in the step S171. When the direction data indicative of "right direction" is received from the portable game machine 100 operating the character Ch1 at a time the direction data and the location data (x, y) included in the position information of the character Ch1 indicates "x" and (0, 0), respectively, such as the above-described state A, the direction data indicated by the position information is not renewed, and the location data (x, y) is renewed from (0, 0) to (1, 0).

If the direction data indicates "left direction (left side of the direction instructing key 10*c*)", "YES" is determined in the step S165, the direction data indicated by the position information is set to "−x" in the step S173, and the location data "x" indicated by the position information is renewed by "1" to the minus (−) side in the step S175. When the direction data indicative of "left direction" is received from the portable game machine 100 operating the character Ch1 in the above-described state A, the direction data and the location data (x, y) indicated by the position information of the character Ch1 are renewed from "x" to "−x" and from (0, 0) to (−1, 0), respectively.

If the direction data indicates "upper direction (upper side of the direction instructing key 10*c*)", "YES" is determined in the step S167, the direction data indicated by the position information is set to "y" in the step S177, and the location data "y" indicated by the position information is renewed by "1" to the plus (+) side in the step S179. When the direction data indicative of "upper direction" is received from the portable game machine 100 operating the character Ch1 in the above-described state A, the direction data and the location data (x, y) indicated by the position information of the character Ch1 are renewed from "x" to "y" and from (0, 0) to (0, 1), respectively.

If the direction data indicates "lower direction (lower side of the direction instructing key 10*c*)", "NO" is determined in the step S167, the direction data indicated by the position information is set to "−y" in the step S181, and the location data "y" indicated by the position information is renewed by "1" to the minus (−) side in the step S183. When the direction data indicative of "lower direction" is received from the portable game machine 100 operating the character Ch1 in the above-described state A, the direction data and the location data (x, y) indicated by the position information of the character Ch1 are renewed from "x" to "−y" and from (0, 0) to (0, −1), respectively.

Since the CRT 300 is displayed with the common game screen at the fixed viewpoint, when the CRT 300 is the operation screen, a character is moved to a direction indicated by the direction data. After completion of the step S171, S175, S179 or S183, the process is restored to the hierarchical upper level of the routine.

Figure 17:
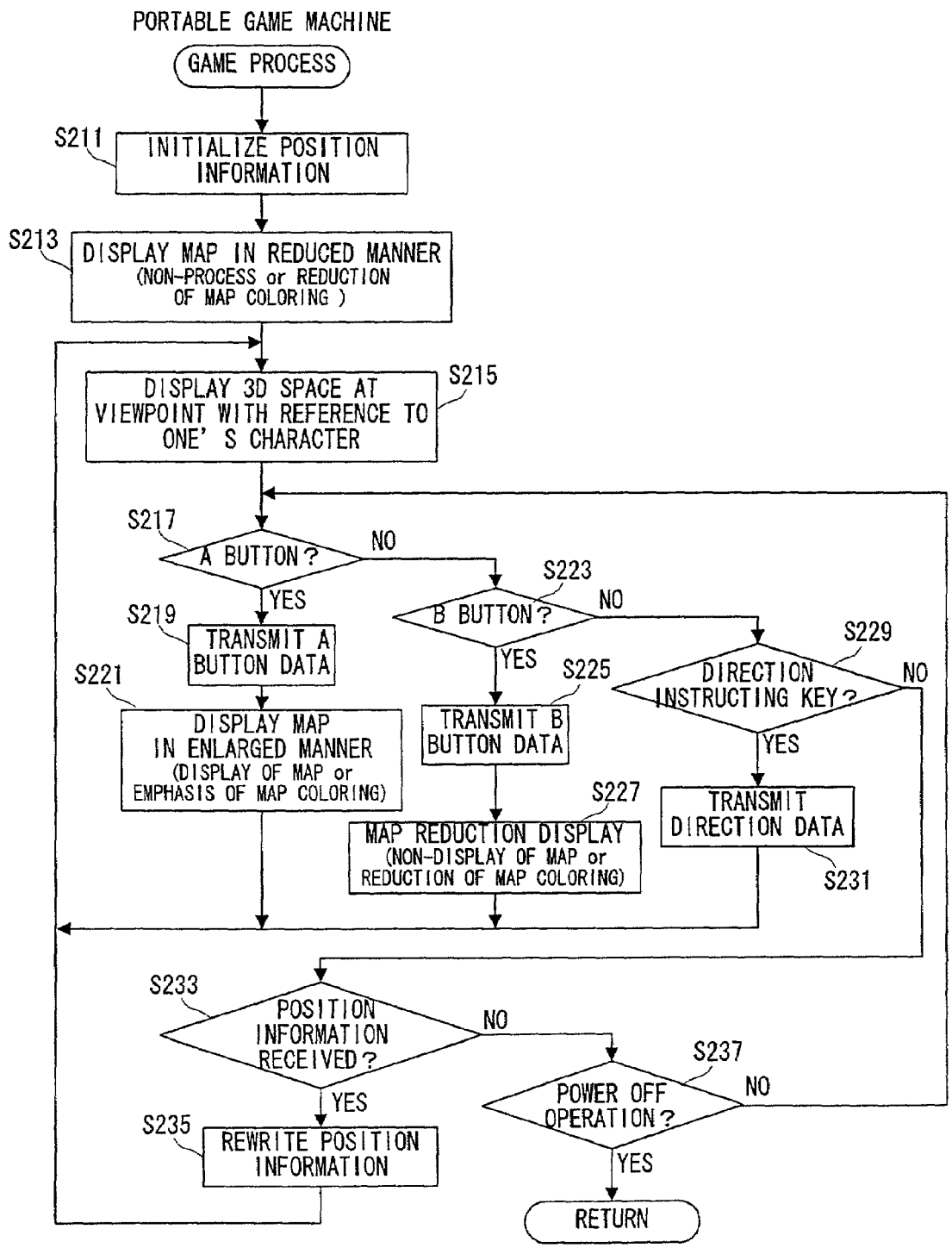
FIG. 17 is a flowchart showing another par of the operation of the portable game machine.

The game process (step S207 in FIG. 12) of the portable game machine 100 complies with a subroutine shown in FIG. 17. First, whole position information held in the table 18*a* shown in FIG. 11 is initialized in a step S211. A processing request for displaying the map M in a reduced manner on the LCD 20 is applied to the image processing unit 22 in a step S213, and a processing request for displaying the game world at the viewpoint with reference to one's character on the LCD 20 is applied to the image processing unit 22 in a following step S215. Thus, the individual game screen of an initialized state shown in FIG. 4 (A) is displayed on the LCD 20 of the portable game machine 100 operating the character Ch1.

Successively, an operation state of an operation device 10 is determined in each of steps S217, S223, and S229, it is determined whether or not the position information is received in a step S233, and it is determined whether or not the power off operation is performed in a step S237.

Where the A button 10*a* is pressed, "YES" is determined in the step S217, the A button data is transmitted to the video game machine 200 in a step S219, and the processing request for displaying the map M in an enlarged manner is applied to the image processing unit 22 in a step S221. After completion of the step S221, the process returns to the step S215. Where the B button 10*b* is pressed, the process proceeds from the step S223 to a step S225 so as to transmit the B button data to the video game machine 200. A processing request for displaying the map M in a reduced manner is applied to the image processing unit 22 in a following step S227.

Accordingly, when the A button 10*a* is pressed in a state the individual game screen shown in FIG. 4 (A) is displayed on the LCD 20, a display of the LCD 20 is renewed from FIG. 4 (A) to FIG. 5. When the B button 10*b* is pressed in a state the individual game screen shown in FIG. 5 is displayed, the display of the LCD 20 is returned from FIG. 5 to FIG. 4 (A).

When the direction instructing key 10c is pressed, "YES" is determined in the step S229, and the direction data is transmitted to the video game machine 200 in a step S231. The direction data indicative of "right direction" is transmitted when "right" is instructed by the direction instructing key 10c, the direction data indicative of "left direction" is transmitted when "left" is instructed, the direction data indicative of "upper direction" is transmitted when the "upper" is instructed, and the direction data indicative of "lower direction" is transmitted when the "lower" is instructed. After completion of the step S231, the process returns to the step S215.

When the position information is received form the video game machine 200, the process proceeds from the step S233 to a step 235 so as to rewrite the position information. Specifically, the table 18a shown in FIG. 11 is accessed, and the current position information is rewritten by the received position information. Where the position information is returned in response to an operation of the direction instructing key 10c provided on one's portable game machine 100, the position information of one's character is rewritten by the returned position information. On the other hand, where the position information is transmitted in response to an operation of the direction instructing key 10c provided on another portable game machine 100, the position information corresponding to the portable game machine 100 is rewritten by the transmitted position information. After completion of the step S235, the process returns to the step S215.

Accordingly, when one's portable game machine 100 is operated utilizing the direction instructing key 10c in order of "upper"→"upper"→"upper"→"right" →"right" at a time the individual game screen shown in FIG. 4 (A) is displayed, the display of the LCD 20 is shifted from FIG. 4 (A) to FIG. 4 (B).

When the power off operation is performed, "YES" is determined in a step S237, and the process is restored to the hierarchical upper level of the routine.

As understood from the above description, the RAM 18 (first memory) provided on the portable game machine 100 is stored with the position information of the characters Ch1 to Ch4 (S211). The RAM 40 (second memory) provided on the video game machine 200 is also stored with the position information of the characters Ch1 to Ch4 (S113). The LCD 20 of the portable game machine 100 (individual display) is displayed with the game world based on the first viewpoint with reference to one's character on the basis of the position information stored in the RAM 18 (S215). On the other hand, the CRT 300 (common display) is displayed with the game world based on the second viewpoint capable of viewing the characters Ch1 to Ch4 on the basis of the position information stored in the RAM 40 (S115, S137).

The portable game machine 100 is provided with the A button 10a and the B button 10b (switching instructing key) for switching the operation screen between the CRT 300 and the LCD 20, and the direction instructing key 10c for instructing one's character to move to an arbitrary direction. The A button data (switching instructing information) is transmitted to the video game machine 200 when the A button 10a is operated (S219), the B button data (switching instructing information) is transmitted to the video game machine 200 when the B button 10b is operated (S215), and the direction data (direction instructing information) is transmitted to the video game machine 200 when the direction instructing key 10c is operated (S231).

The video machine 200, when the A button data or the B button data is received (S117, S137), switches a setting of the operation screen of the portable game machine 100 of the transmission source according to the received data (S121, S127). Furthermore, the video game machine 200, when the direction data is received (S129), renews the position information of the character operated by the transmission source on the basis of the direction data and the setting of the operation screen by the transmission source (S133). The renewed position information is transmitted to the portable game machine 100 (S135). In the portable game machine 100, the position information stored in the RAM 18 is rewritten by the position information received from the video game machine 200 (S235). Thus, one's character displayed on the CRT 300 and one's LCD 20 is moved to a direction corresponding to the viewpoint of the game world displayed on the operation screen. The setting of the operation screen can be arbitrarily switched, and therefore, it is possible to improve an operationality of the game utilizing the direction instructing key.

The LCD 20 is also displayed with the map of the game world capable of viewing positions of the characters Ch1 to Ch 4 in a reduced manner (S213). The map is enlarged in response to an operation of the A button 10a (S221) and is reduced in response to an operation of the B button 10b (S227). Accordingly, it is possible to progress the game with continuously viewing one's LCD, and therefore, the operationality is improved at this point.

It is noted that although the map on the individual game screen is enlarged/reduced in accordance with the setting of the operation screen in this embodiment, in place of this, a display of the map may be turned on/off, or a color of the game world displayed in a three-dimensional manner and a color of the map may be relatively changed. In the former case, there is a need to omit the process in the step S213 shown in FIG. 17, to execute a display processing of the map in place of the enlargement display processing of the map in the step S221 and to execute non-display processing of the map in place of the reduction display processing of the map in the step S227. Furthermore, in the latter case, there is a need to perform a reduction processing of the color of the map in the step S213 and step S227 and to perform an emphasis processing of the color of the map in the step S221.

Figure 18:
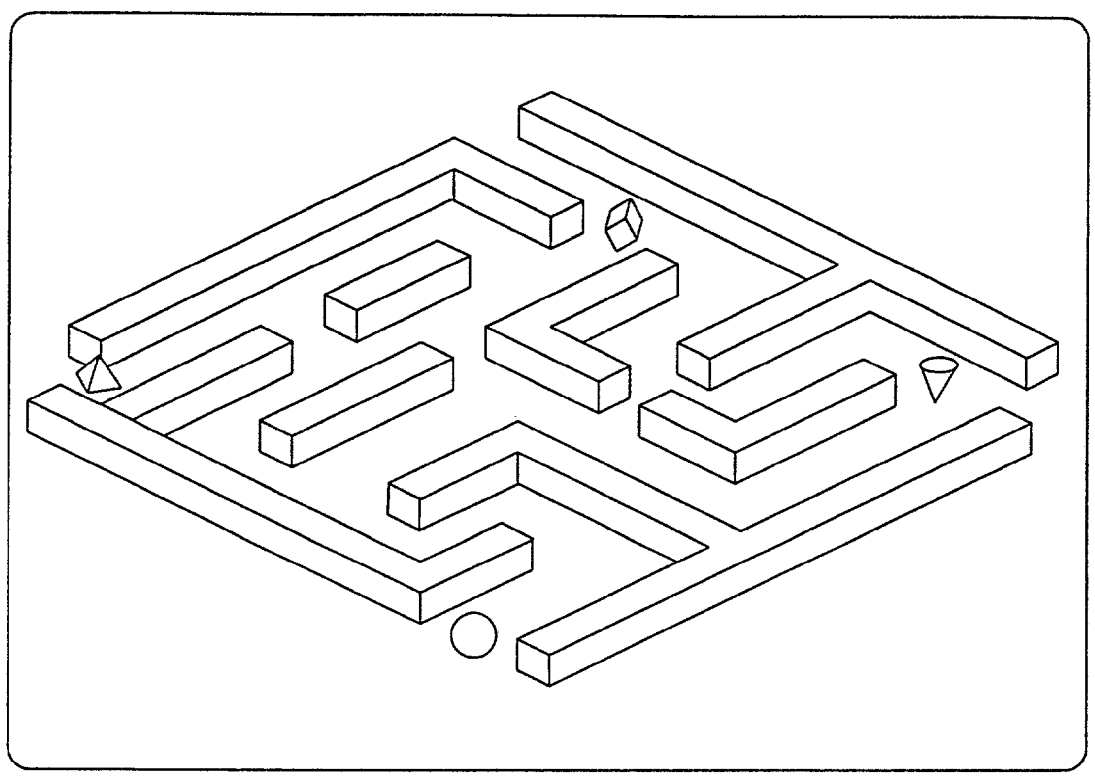
FIG. 18 is an illustrative view showing another example of the common game screen displayed on the CRT.
Figure 19:
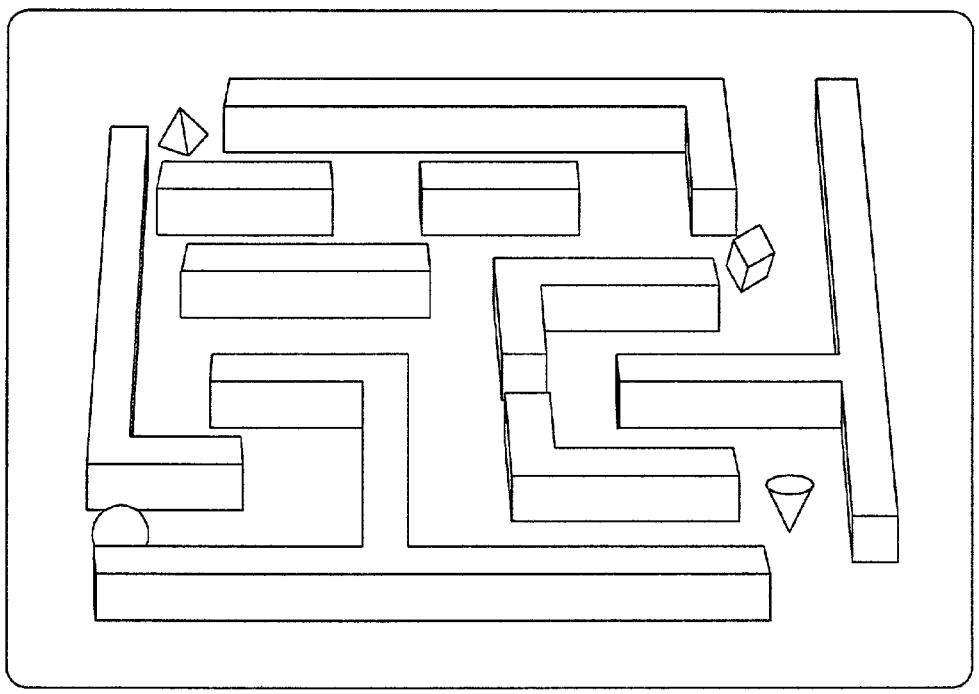
FIG. 19 is an illustrative view showing the other example of the common game screen displayed on the CRT.
Figure 20:
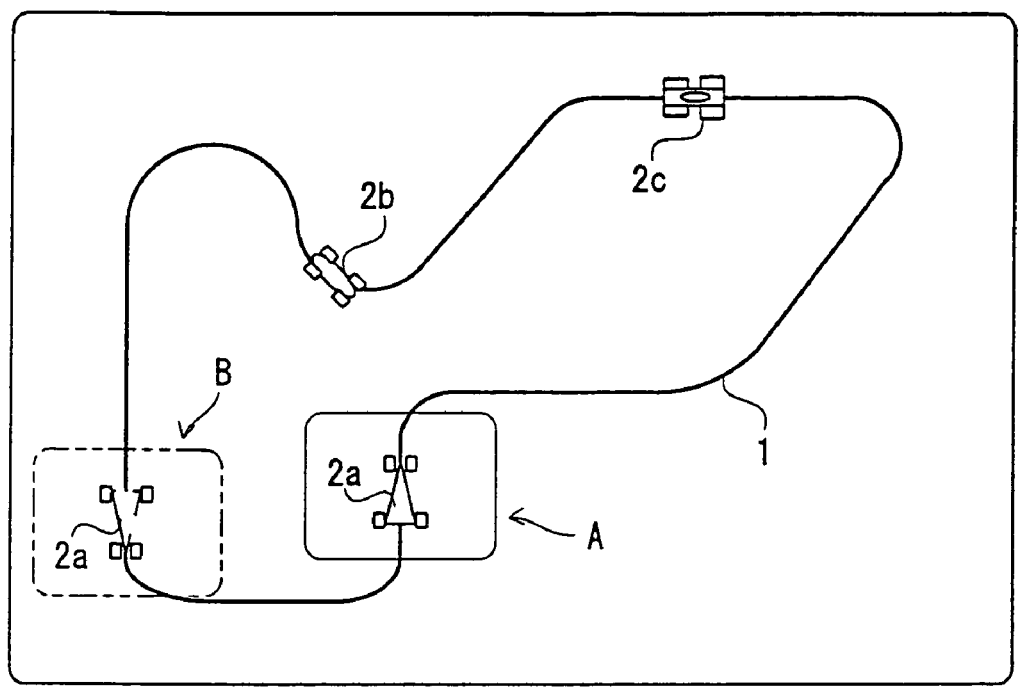
FIG. 20 is an illustrative view showing one example of the common game screen displayed on the CRT in a prior art.

Furthermore, although the two-dimensional game world shown in FIG. 3 is displayed on the CRT in this embodiment, the three-dimensional game world shown in FIG. 18 may be alternatively displayed on the CRT. In addition, if the game world viewed from a front oblique upper position is displayed as shown in FIG. 19, the operability is more improved.

Furthermore, although this embodiment is described with utilizing the game moving the plurality of characters Ch1 to Ch4 in the game world shown in FIG. 2, it is needless to say that the present invention can be applied to the racing game shown in FIG. 21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game system displaying a game world in which a plurality of characters including a player character operated by a direction instructing key appear on a common display device and an individual display device assigned to a player, comprising:
   a first display processing mechanism for displaying on said individual display device the game world from a first viewpoint with reference to the player character;
   a second display processing mechanism for displaying on said common display device the game world from a second viewpoint capable of viewing a plurality of the characters;
   a selection key for selecting one of said common display device and said individual display device as an operation display device;
   a switching mechanism for switching said operation display device between the common display device and the individual display device in response to an operation of said selection key; and
   a character moving processing mechanism for moving the player character on said operation display device to a direction coincident with an operating direction of said direction instructing key, and moving the player character on a display device other than said operation display device in accordance with a moving of the player character on said operation display device.

2. A game system according to claim 1, wherein said character moving processing mechanism includes a first determination mechanism for determining a direction of player character movement based on the first viewpoint and the direction indicated by the direction instructing key when said individual display is switched as said operation display, and a second determination mechanism for determining a direction of player character movement on the basis of the second viewpoint and a direction indicated by said direction instructing key when said common display device is switched as said operation display device.

3. A game system according to claim 1, further comprising a memory for storing position information of the player character, wherein said first display processing mechanism displays the game world with reference to a position according to the position information, said second display processing mechanism displays the game world so that the player character exists at a position according to the position information, and said character moving processing mechanism includes a renewal mechanism for renewing the position information on the basis of a direction of player character movement.

4. A game system according to claim 1, further comprising a third display device processing mechanism for displaying on said individual display device a map of the game world capable of viewing at least a position of the player character at the second viewpoint.

5. A game system according to claim 4, further comprising a first control mechanism for controlling display/non-display of the map in accordance with a switching state of said operation display device.

6. A game system according to claim 4, further comprising a control mechanism for controlling emphasis/non-emphasis of the map in accordance with a switching state of said operation display device.

7. A game system according to claim 6, wherein said control mechanism enlarges the map when said common display device is switched as said operation display device and reduces the map when said individual display device is switched as said operation display device.

8. A game system according to claim 6, wherein said control mechanism colors the map more than it colors the game world when said common display device is switched as said operation display device, and colors the game world more than it colors the map when said individual display device is switched as said operation display device.

9. A game system according to claim 1, comprising a plurality of the individual display devices, a plurality of the direction instructing keys and a plurality of the selection keys respectively assigned to a plurality of the player characters, wherein said first display processing mechanism displays the game world from the first viewpoint with reference to each of the player characters on each of the individual display device, said switching mechanism switches a switching state of each of the operation display devices in response to the operation of each of the selection keys, and said character moving processing mechanism moves each of the player characters to a direction based on the viewpoint of the game world displayed on each of the operation displays and a direction indicated by each of the direction instructing keys when each of the direction instructing keys is operated.

10. A game system including a video game machine connected to a common display device and a portable game machine having an individual display device and a direction instructing key, said game system displaying a game world in which a plurality of characters including a player character operated by said portable game machine appear on said common display device and said individual display device, wherein
   said portable game machine comprises:
      a first display processing mechanism for displaying on said individual display device the game world from a first viewpoint with reference to the player character;
      a selection key for selecting one of said common display device and said individual display device as an operation display device; and
      a first character moving mechanism for moving the player character in a first moving direction based on a viewpoint of a game world displayed on said operation display device and a direction instructed by said direction instructing key when said direction instructing key is operated,
   said video game machine comprises:
      a second display processing mechanism for displaying on said common display device the game world from a second viewpoint capable of viewing a plurality of the characters;
      a switching mechanism for switching said operation display device between the common display device and the individual display device in response to an operation of said selection key; and
      a second character moving mechanism for moving the player character to a second moving direction based on a viewpoint of the game world displayed on said operation display device and a direction instructed by said direction instructing key when said direction instructing key is operated.

11. A game system according to claim 10, wherein
   said portable game machine comprises: a direction data transmitting mechanism for transmitting direction data to said video game machine in response to an operation of said direction instructing key; and a first memory for storing position information of the player character, and
   said video game machine comprises: a second memory for storing the position information of the player character; and a position information transmitting mechanism for transmitting position information stored in said second memory to said portable game machine when the position information is renewed, wherein said first character moving mechanism renews the position information stored in said first memory by the position information transmitted from said video game machine, and said second character moving mechanism renews the position information stored in said second memory on the basis of the direction data transmitted form said portable game machine.

12. A game system according to claim 11, wherein said first display processing mechanism displays the game world with reference to a position according to the position information stored in said first memory, and said second display processing mechanism displays the game world such that the player character exists at a position according to the position information stored in said second memory.

13. A game system according to claim 10, wherein said portable game machine further comprises a third display processing mechanism for displaying from the second viewpoint a map of the game world capable of viewing at least a position of the player character on said individual display device.

14. A game system according to claim 13, wherein said portable game machine further comprises a first control mechanism for controlling display/non-display of the map in accordance with a switching state of said operation display device.

15. A game system according to claim 13, wherein said portable game machine further comprises a control mechanism for controlling emphasis/non-emphasis of the map in accordance with a switching state of said operation display device.

16. A game system according to claim 15, wherein said control mechanism enlarges the map when said common display device is switched as said operation display device and reduces the map when said individual display device is switched as said operation display device.

17. A game system including a video game machine connected to a common display device and a portable game machine provided with an individual display device, and said game system displaying a game world in which a plurality of characters including a player character operated by said portable game machine appear on said common display device and said individual display device, wherein
said portable game machine comprises:
a first memory for storing position information of the player character;
a first display processing mechanism for displaying the game world on said individual display device from a first viewpoint with reference to the player character on the basis of the position information stored in said first memory;
a switching instructing key for instructing a switch of an operation display device between said common display device and said individual display device;
a direction instructing key for instructing a moving of the player character in a selected direction;
a switching instructing information transmitting mechanism for transmitting switching instructing information to said video game machine when said switching instructing key is operated;
a direction instructing information transmitting mechanism for transmitting direction instructing information to said video game machine when said direction instructing key is operated;
a position information receiving mechanism for receiving position information of the player character from said video game machine; and
a rewriting mechanism for rewriting the position information held in said first memory by the received position information, and
said video game machine comprises:
a second memory for storing position information of the player character;
a second display processing mechanism for displaying the game world on said common display device from a second viewpoint capable of viewing a plurality of the characters including the player character on the basis of the position information stored in said second memory;
a switching instructing information receiving mechanism for receiving the switching instructing information from said portable game machine;
a direction instructing information receiving mechanism for receiving the direction instructing information from said portable game machine;
a switching mechanism for switching said operation display device between the common display device and the individual display device according to the received switching instructing information;
a renewal mechanism for renewing the position information of the player character held in said second memory on the basis of the received direction instructing information and a switching state of said operation display device, and
a position information transmitting mechanism for transmitting the renewed position information to said portable game machine.

18. A game system according to claim 17, wherein said renewal mechanism renews the position information such that the player character moves to a moving direction based on a viewpoint of the game world displayed on said operation display device and a direction indicated by the direction instructing information.

19. A game system according to claim 17, comprising a plurality of the portable game machines which respectively operates a plurality of the player characters, wherein the first memory of each of the portable game machines is stored with position information of the player characters, the first display processing mechanism of each of the portable game machines displays the game world on one's individual display device at the first viewpoint with reference to one's player character, the position information receiving mechanism of each of the portable game machines receives the position information of the player characters from the video game machine, the second memory of the video game machine is stored with the position information of the player characters, the second display processing mechanism of the video game machine displays the game world at the second viewpoint capable of viewing the player characters, the switching mechanism of the video game machine switches a state of an operation display device of a transmission source of the received switching instructing information, the renewal mechanism of the video game machine renews, on the basis of the received direction instructing information and a switching state of the operation display device of the transmission source of the direction instructing information, the position information of the player character operated by the transmission source of the direction instructing key, and the position information transmitting mechanism transmits the renewed position information to each of the portable game machines.

20. A computer readable memory medium encoded with a game program which is executed by a game system including a video game machine connected to a common display device and a portable game machine provided with an individual display device, said game system displaying a game world in which a plurality of characters including a player character operated by said portable game machine appear on said common display device and said individual display device, wherein steps executed by said portable game machine includes a step for storing position information of the player character in a first memory, a step for displaying the game world on said individual display device from a first viewpoint with reference to the player character on the basis of the position information stored in said first memory, a step for accepting an operation of a switching instructing key for instructing switching of an operation display device between said common display device and said individual display device, a step for accepting an operation of a direction instructing key for instructing moving of the player character in a selected direction, a step for transmitting switching instructing information to said video game machine when said switching instructing key is operated, a step for transmitting direction instructing information to said video game machine when said direction instructing key is operated, a step for receiving position information of the player character from said video game machine, and a step for rewriting the position information held in said first memory by the received position information, and steps executed by said video game machine includes a step for storing position information of the player character in a second memory, a step for displaying the game world on said common display device from a second viewpoint capable of viewing a plurality of the characters including the player character on the basis of position information stored in the second memory, a step for receiving the switching instructing information from said portable game machine, a step for receiving the direction instructing information from said portable game machine, a step for switching said operation display device between the common display device and the individual display device according to the received switching instructing information, a step for renewing the position information of the player character held in said second memory on the basis of the received direction instructing information and a switching state of said operation display device, and a step for transmitting the renewed position information to said portable game machine.

21. A game system which displays on a first display device and a second display device a three-dimensional game world in which a player character is moved in response to an operation of a direction instructing key, comprising:

a first display processing mechanism for displaying on said first display device the game world in a three-dimensional view which views a moving direction of the player character;

a second display processing mechanism for displaying on said second display device the game world in a two-dimensional view which views the player character from above;

a switching mechanism for switching an operation display device which is referred to for operating said direction instructing key between said first display device and said second display device; and a changing mechanism for changing in accordance with a switching by said switching mechanism the moving direction of the player character corresponding to the operation of said direction instructing key.

22. A game system according to claim 21, further comprising:

a memory for storing direction information indicating a direction of the player character; and a renewal mechanism for renewing the direction information stored in said memory in response to the operation of said direction instructing key, wherein said first display processing mechanism determines the view based on the direction information stored in said memory.

23. A game system according to claim 21, further comprising:

a first determining mechanism for determining the moving direction based on a direction of the player character and an operating manner of said direction instructing key when said first display device is the operation display device; and a second determining mechanism for determining the moving direction based on only the operating manner of said direction instructing key when said second display device is the operation display device.

24. A game method of a game system which displays on a first display device and a second display device a three-dimensional game world in which a player character is moved in response to an operation of a direction instructing key, comprising the steps of:

(a) displaying on said first display device the game world in a three-dimensional view which views a moving direction of the player character;

(b) displaying on said second display device the game world in a two-dimensional view which views the player character from above;

(c) switching an operation display device which is referred to for operating said direction instructing key between said first display device and said second display device; and (d) changing in accordance with a switching in said step (c) the moving direction of the player character corresponding to the operation of said direction instructing key.

25. A computer readable memory medium encoded with a game program executed by a game system which displays on a first display device and a second display device a three-dimensional game world in which a player character is moved in response to an operation of a direction instructing key, wherein said game program comprising the steps of:

(a) displaying on said first display device the game world in a three-dimensional view which views a moving direction of the player character;

(b) displaying on said second display device the game world in a two-dimensional view which views the player character from above;

(c) switching an operation display device which is referred to for operating said direction instructing key between said first display device and said second display device; and (d) changing in accordance with a switching in said step (c) the moving direction of the player character corresponding to the operation of said direction instructing key.

26. A game system which displays on a first display device and a second display device a three-dimensional game world in which a player character is moved in response to an operation of a direction instructing key, comprising:
- a first display processing mechanism for displaying on said first display device the game world in a dynamic view which changes in response to a moving of the player character;
- a second display processing mechanism for displaying on said second display device the game world in a static view without regard to the moving of the player character;
- a switching mechanism for switching an operation display device which is referred to for operating said direction instructing key between said first display device and said second display device; and
- a changing mechanism for changing in accordance with a switching by said switching mechanism the moving direction of the player character corresponding to the operation of said direction instructing key.

27. A game system according to claim 26, further comprising:
- a memory for storing direction information indicating a direction of the player character; and
- a renewal mechanism for renewing the direction information stored in said memory in response to the operation of said direction instructing key, wherein said first display processing mechanism determines the view based on the direction information stored in said memory.

28. A game system according to claim 26, further comprising:
- a first determining mechanism for determining the moving direction based on a direction of the player character and an operating manner of said direction instructing key when said first display device is the operation display device; and
- a second determining mechanism for determining the moving direction based on only the operating manner of said direction instructing key when said second display device is the operation display device.

29. A game method of a game system which displays on a first display device and a second display device a three-dimensional game world in which a player character is moved in response to an operation of a direction instructing key, comprising the steps of:
- (a) displaying on said first display device the game world in a dynamic view which changes in response to a moving of the player character;
- (b) displaying on said second display device the game world in a static view without regard to the moving of the player character;
- (c) switching an operation display device which is referred to for operating said direction instructing key between said first display device and said second display device; and
- (d) changing in accordance with a switching in said step (c) the moving direction of the player character corresponding to the operation of said direction instructing key.

30. A computer readable memory medium encoded with a game program executed by a game system which displays on a first display device and a second display device a three-dimensional game world in which a player character is moved in response to an operation of a direction instructing key, wherein said game program comprising the steps of:
- (a) displaying on said first display device the game world in a dynamic view which changes in response to a moving of the player character;
- (b) displaying on said second display device the game world in a static view without regard to the moving of the player character;
- (c) switching an operation display device which is referred to for operating said direction instructing key between said first display device and said second display device; and
- (d) changing in accordance with a switching in said step (c) the moving direction of the player character corresponding to the operation of said direction instructing key.

31. A game system displaying a game world in which a plurality of characters including a player character operated by a direction instructing key appear on a common display device and an individual display device assigned to a player, comprising:
- a first display processing mechanism for displaying on said individual display device the game world from a first viewpoint with reference to the player character;
- a second display processing mechanism for displaying on said common display device the game world from a second viewpoint capable of viewing a plurality of the characters;
- a selection key for selecting one of said common display device and said individual display device as an operation display device;
- a switching mechanism for switching said operation display device between the common display device and the individual display device in response to an operation of said selection key; and
- a character moving processing mechanism for moving the player character on said operation display device to a direction coincident with an operating direction of said direction instructing key, and moving the player character on a display device other than said operation display device in accordance with a moving of the player character on said operation display device, wherein the direction coincident with the operating direction of the direction instructing key changes when the selection of the operation display device via the selection key changes.

32. A game system displaying a game world in which a plurality of characters including a player character operated by a direction instructing key appear on a common display device and an individual display device assigned to a player, comprising:
- a first display processing mechanism for displaying on said individual display device the game world from a first viewpoint with reference to the player character;
- a second display processing mechanism for displaying on said common display device the game world from a second viewpoint capable of viewing a plurality of the characters;
- a selection key for selecting one of said common display device and said individual display device as an operation display device;
- a switching mechanism for switching said operation display device between the common display device and the individual display device in response to an operation of said selection key; and
- a character moving processing mechanism for moving the player character on said operation display device to a direction coincident with an operating direction of said direction instructing key, and moving the player character on a display device other than said operation display device in accordance with a moving of the player character on said operation display device so that moving the player character between two points in the game world require different operation on the direction instructing key when the common display device is selected as the operation display device and when the individual display device is selected as the operation display device.

33. A game method of a game system which displays on a common display device and an individual display device a game world in which a player character is moved in response to an operation of a direction instructing key, the method comprising:
   (a) displaying on said individual display device the game world in a view which views a moving direction of the player character;
   (b) displaying on said common display device the game world in a view which views the player character and which is capable of viewing at least another character;
   (c) switching an operation display device which is referred to for operating said direction instructing key between said individual display device and said common display device; and
   (d) moving the player character on said operation display device to a direction coincident with an operating direction of said direction instructing key, and moving the player character on a display device other than said operation display device in accordance with a moving of the player character on said operation display device so that moving the player character between two points in the game world require different operation on the direction instructing key when the common display device is selected as the operation display device and when the individual display device is selected as the operation display device.

34. A game system according to claim 1, wherein the individual display device simultaneously displays on a same screen both the game world from the first viewpoint and a view of the game world at least resembling the view of the game world from the second viewpoint.

35. A game system according to claim 10, wherein the portable game device simultaneously displays on a same screen both the game world from the first viewpoint and a view of the game world at least resembling the view of the game world from the second viewpoint.

36. A game system according to claim 21, wherein the first display processing mechanism simultaneously displays on the first display device both the three-dimensional view and a view at least resembling the two-dimensional view.

37. A game method according to claim 24, wherein the first display processing mechanism simultaneously displays on the first display device both the three-dimensional view and a view at least resembling the two-dimensional view.

* * * * *